(12) United States Patent
Cho et al.

(10) Patent No.: US 10,884,685 B2
(45) Date of Patent: Jan. 5, 2021

(54) JOB EXECUTION CONTROL DEVICE, JOB EXECUTION CONTROL METHOD, AND COMPUTER PROGRAM PRODUCT

(71) Applicants: Kabushiki Kaisha Toshiba, Minato-ku (JP); Toshiba Digital Solutions Corporation, Kawasaki (JP)

(72) Inventors: Kenta Cho, Kawasaki (JP); Megumi Aikawa, Kawasaki (JP); Kouji Yasuda, Yokohama (JP)

(73) Assignees: Kabushiki Kaisha Toshiba, Minato-ku (JP); Toshiba Digital Solutions Corporation :, Kawasaki (JP)

( * ) Notice: Subject to any disclaimer, the term of this patent is extended or adjusted under 35 U.S.C. 154(b) by 0 days.

(21) Appl. No.: 16/001,389

(22) Filed: Jun. 6, 2018

(65) Prior Publication Data
US 2018/0357025 A1    Dec. 13, 2018

(30) Foreign Application Priority Data
Jun. 9, 2017    (JP) .................................. 2017-114557

(51) Int. Cl.
*G06F 3/12*    (2006.01)
*G06Q 10/10*    (2012.01)
(Continued)

(52) U.S. Cl.
CPC .......... *G06F 3/1256* (2013.01); *G06F 3/1208* (2013.01); *G06F 3/1227* (2013.01);
(Continued)

(58) Field of Classification Search
None
See application file for complete search history.

(56) References Cited

U.S. PATENT DOCUMENTS 8,687,208 B2 *  4/2014  Nakatsuka ............ G06F 3/1219
                                                                358/1.1
8,879,086 B2 * 11/2014  Mizuno .................. G06F 3/122
                                                                358/1.14
(Continued)

FOREIGN PATENT DOCUMENTS

| JP | 2000-347884 | 12/2000 |
| JP | 2002-215423 | 8/2002 |
| JP | 4861876 | 1/2012 |

*Primary Examiner* — Dung D Tran
(74) *Attorney, Agent, or Firm* — Oblon, McClelland, Maier & Neustadt, L.L.P.

(57) ABSTRACT

A job execution control device according to an embodiment controls the execution of jobs defined according to job definitions; and includes a display control unit that controls the display of a UI screen for receiving user operations, and a job executing unit that executes jobs according to user operations performed using the UI screen and records a job execution history. The display control unit displays a job definition list in the UI screen and, when any one job definition is selected from the job definition list, displays, as input candidates, one or more already-executed jobs usable as the input for the job to be executed according to the selected job definition. When an already-executed job is selected from the input candidates, the job executing unit performs job execution according to the job definition selected from the job definition list, with the output of selected already-executed job serving as the input.

17 Claims, 24 Drawing Sheets

(51) Int. Cl.
*G06Q 10/06* (2012.01)
*G10L 15/06* (2013.01)

(52) U.S. Cl.
CPC ....... *G06F 3/1273* (2013.01); *G06Q 10/0633* (2013.01); *G06Q 10/10* (2013.01); *G10L 15/06* (2013.01)

(56) References Cited

U.S. PATENT DOCUMENTS

| | | |
|---|---|---|
| 2002/0129329 A1 | 9/2002 | Nishioka et al. |
| 2007/0201091 A1* | 8/2007 | Tanaka ................... G06F 3/1204 358/1.16 |
| 2007/0279667 A1 | 12/2007 | Hattori et al. |
| 2010/0128309 A1* | 5/2010 | Matoba ................ G06K 15/005 358/1.15 |
| 2011/0261399 A1 | 10/2011 | Hattori et al. |
| 2012/0327463 A1* | 12/2012 | Mizuno ................... G06F 3/122 358/1.15 |
| 2013/0301068 A1* | 11/2013 | Yamada ............. H04N 1/00856 358/1.13 |
| 2013/0321841 A1* | 12/2013 | Nakajima ................ H04N 1/21 358/1.13 |
| 2014/0082137 A1* | 3/2014 | Matoba ................... H04L 67/06 709/217 |
| 2015/0156361 A1* | 6/2015 | Kayama ............... H04N 1/6008 358/1.9 |

* cited by examiner

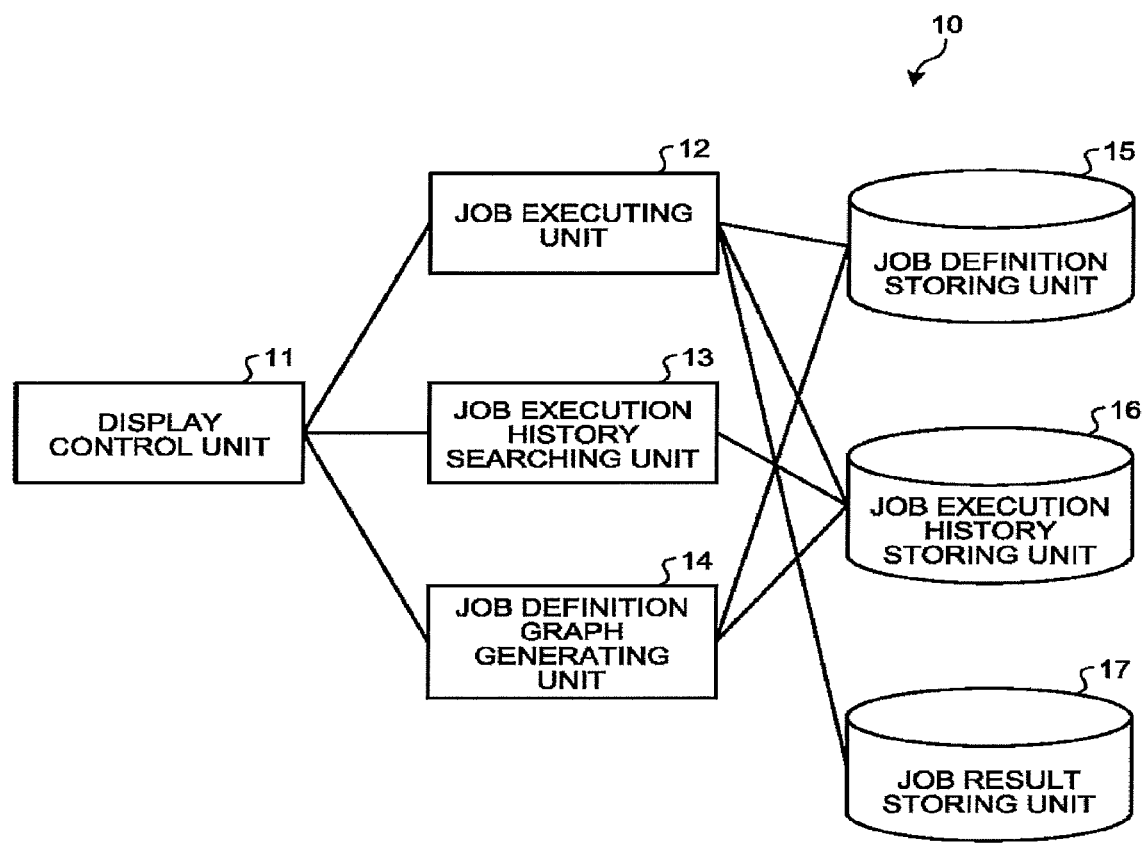

FIG.3

```
type:
        name: generate_user_words
        description: USER WORD GENERATION input:
        documents_data_ job:
                type: job
                job_type: register_documents
                description: DOCUMENT DATA JOB
script:
        extract_words $documents_data_ job/*
```

FIG.4

```
type:
            name: eval_dic
            description: DICTIONARY ACCURACY EVALUATION input:
            user_words_data_ job:
                    type: job
                      job_type: [register_user_words, generate_user_words]
                    description: USER WORD DATA JOB
            dic_data_ job:
                    type: job
                    job_type: create_dic
                    description: DICTIONARY DATA JOB
            eval_data_ job:
                    type: job
                     job_type: register_transcript
                    description: EVALUATION DATA JOB script:
            cp $eval_data_ job/audio/* $workdir/audio
            cp $eval_data_ job/transcript/* $workdir/transcript
            eval $dic_data_ job/vr.dic $user_words_data_ job/words.txt output:
            cat precision. json
```

FIG.5

```
type:
        name: create_dic
        description: DICTIONARY GENERATION input:
        audio_model_data_ job:
                type: job
                job_type: create_audio_model
                description: ACOUSTIC MODEL DATA JOB
        user_words_data_ job:
                type: job
                job_type: [register_user_words, generate_user_words]
                optional: true
                description: USER WORD DATA JOB script:
        make_dic $eval_data_ job $user_words_data_ job
```

FIG.6

| ID | JOB DEFINITION | INPUT | OUTPUT | COMPLETION TIME | STATE |
|---|---|---|---|---|---|
| 1 | register_voices | {···} | - | 12-25-2016 | COMPLETED |
| 2 | register_documents | {···} | - | 12-26-2016 | COMPLETED |
| 3 | register_documents | {···} | - | 1-6-2017 | COMPLETED |
| ⋮ | ⋮ | ⋮ | ⋮ | ⋮ | ⋮ |

"documents_dir" : "/work/marketing/meetings/"

"user_words_data_job": 120,
"dic_data_job": 107,
"eval_data_job": 115

"precision": 0.875

}

| ID | JOB DEFINITION | INPUT | OUTPUT |
|---|---|---|---|
| 1 | generate_audio_model | [ ] | [2] |
| 2 | generate_dic | [1] | [3] |
| 3 | eval_dic | [2] | [ ] |

FIG.23

| ID | JOB DEFINITION | INPUT ARGUMENT | JOB EXECUTION SUCCESS-FAILURE HISTORY ID |
|---|---|---|---|
| 1 | generate_user_words | documents_data_job | [1, 2, 3, 4, ⋯] |
| 2 | eval_dic | user_words_data_job | [⋯] |
| 3 | eval_dic | dic_data_job | [⋯] |
| 4 | eval_dic | eval_data_job | [⋯] |
| ⋮ | ⋮ | ⋮ | ⋮ |

FIG.24

| ID | INPUT JOB ID | JOB TYPE | EXECUTION JOB ID | EXECUTION RESULT |
|---|---|---|---|---|
| 1 | 5 | register_documents | 11 | SUCCESS |
| 2 | 12 | register_voices | 35 | FAILURE |
| 3 | 15 | register_documents | 42 | FAILURE |
| 4 | 18 | register_documents | 53 | SUCCESS |
| ⋮ | ⋮ | ⋮ | ⋮ | ⋮ |

FIG.25

```
type:
        name: eval_dic
        description: DICTIONARY ACCURACY EVALUATION input:
        user_words_data_job:
                type: job
                description: USER WORD DATA JOB
                score_impact: 0.3
        dic_data_job:
                type: job
                description: DICTIONARY DATA JOB
                score_impact: 0.7
        eval_data_job:
                type: job
                description: EVALUATION DATA JOB script:

cp $eval_data_job/audio/*    $workdir/audio
        cp $eval_data_job/transcript/*    $workdir/transcript
        eval $dic_data_job/vr.dic $user_words_data_job/words.txt output:
        cat precision.json score:
        precision
```

FIG.26

| ID | JOB DEFINITION | | SCORE |
|---|---|---|---|
| 1 | register_voices | ... | 0.75 |
| 2 | register_documents | ... | 0.05 |
| 3 | register_documents | ... | 0.55 |
| ⋮ | ⋮ | ⋮ | ⋮ |

FIG.30

| ID | JOB FLOW SEQUENCE |
|---|---|
| 1 | RELATED-DOCUMENT REGISTRATION, USER WORD GENERATION, DICTIONARY ACCURACY EVALUATION |
| 2 | SPEECH REGISTRATION, TRANSCRIPT REGISTRATION, ACOUSTIC MODEL GENERATION, DICTIONARY GENERATION, DICTIONARY ACCURACY EVALUATION |
| 3 | USER WORD REGISTRATION, DICTIONARY ACCURACY EVALUATION |
| 4 | SPEECH REGISTRATION, TRANSCRIPT REGISTRATION, ACOUSTIC MODEL GENERATION, DICTIONARY GENERATION, DICTIONARY ACCURACY EVALUATION |
| 5 | RELATED-DOCUMENT REGISTRATION, USER WORD GENERATION, DICTIONARY ACCURACY EVALUATION |
| 6 | SPEECH REGISTRATION, TRANSCRIPT REGISTRATION, ACOUSTIC MODEL GENERATION, DICTIONARY GENERATION, DICTIONARY ACCURACY EVALUATION |

JOB EXECUTION CONTROL DEVICE, JOB EXECUTION CONTROL METHOD, AND COMPUTER PROGRAM PRODUCT

CROSS-REFERENCE TO RELATED APPLICATIONS

This application is based upon and claims the benefit of priority from Japanese Patent Application No. 2017-114557, filed on Jun. 9, 2017; the entire contents of which are incorporated herein by reference.

FIELD

Embodiments described herein relate generally to a job execution control device, a job execution control method, and a computer program product.

BACKGROUND

A conventional technology is known in which a job flow is registered that indicates a plurality of operations to be executed according to an application and indicates the sequence of execution of the operations; and, when the registered job flow is selected, a plurality of operations is sequentially executed according to the job flow, thereby enabling achieving enhancement in the operability. However, in a conventional job flow, it is a fixed notion that the result of the preceding operation is used as the input for the subsequent operation. Hence, it is not possible to select the result of one of a plurality of operations and to use the selected result as the input for the subsequent operation. In that regard, there is a demand for improvement. Meanwhile, in this written description, a unit of operation that includes performing a predetermined operation in response to the receipt of a particular input and then outputting the result of the operation is called a "job".

BRIEF DESCRIPTION OF THE DRAWINGS

FIG. 1 is a block diagram illustrating an exemplary functional configuration of a job execution control device;

FIG. 2 is a diagram illustrating a job definition of a related-document registration job;

FIG. 3 is a diagram illustrating a job definition of a user word generation job;

FIG. 4 is a diagram illustrating a job definition of a dictionary accuracy evaluation job;

FIG. 5 is a diagram illustrating a job definition of a dictionary generation job;

FIG. 6 is a diagram illustrating an example of a job execution history;

FIG. 7 is a diagram illustrating an exemplary input for the related-document registration job;

FIG. 8 is a diagram illustrating an exemplary input for the dictionary accuracy evaluation job;

FIG. 9 is a diagram illustrating an exemplary output of the dictionary accuracy evaluation job;

FIG. 23 is a diagram illustrating an example of an input job definition history;

FIG. 24 is a diagram illustrating an example of a job execution success-failure history;

FIG. 25 is a diagram illustrating an exemplary job definition for which a score can be calculated;

FIG. 26 is a diagram illustrating an example of the job execution history including the scores;

FIG. 30 is a diagram illustrating an example of job flow sequences; and

DETAILED DESCRIPTION

Figure 10:
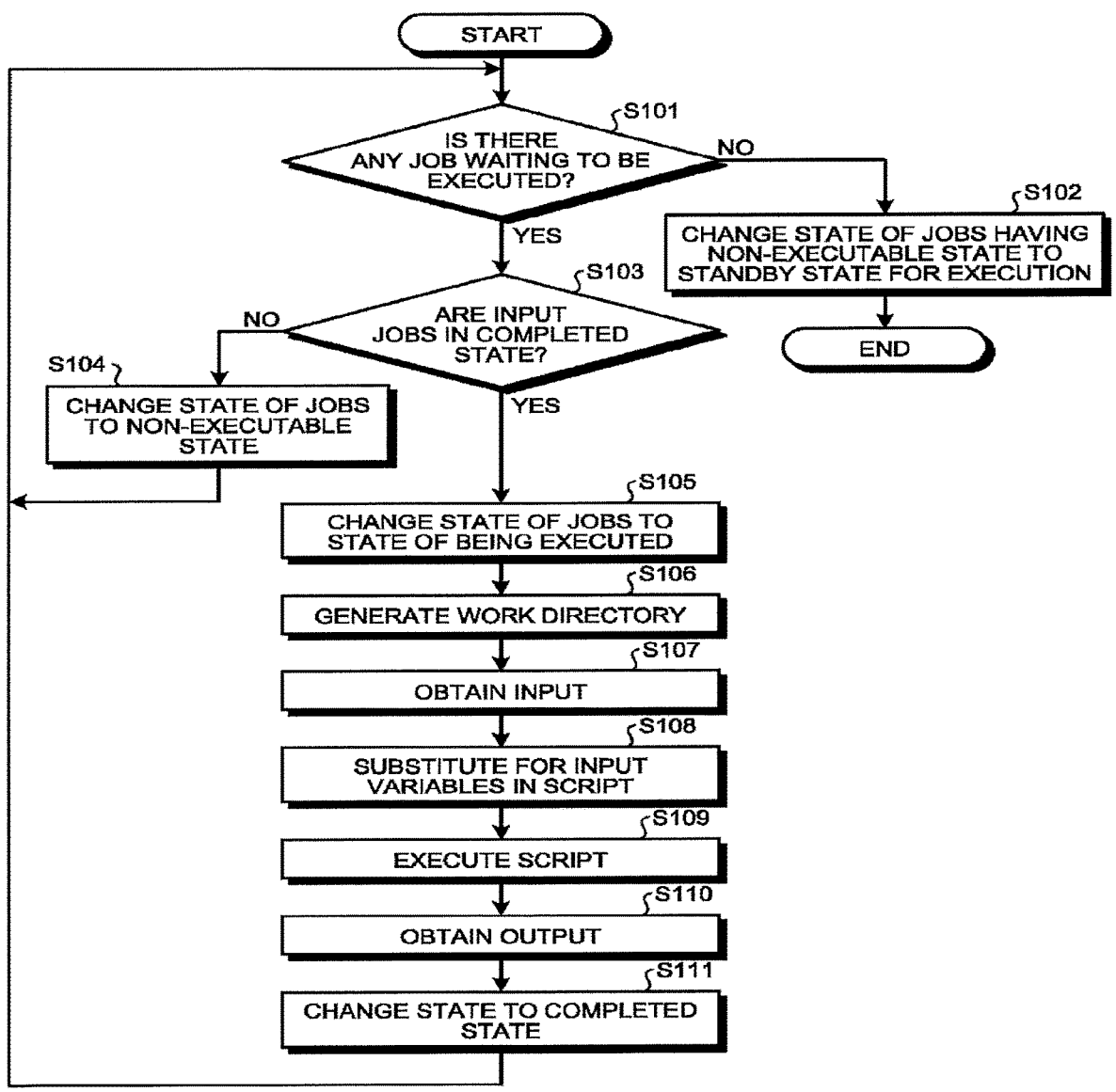
FIG. 10 is a flowchart for explaining an exemplary sequence of operations performed at a time of executing a job.

A job execution control device according to embodiments controls the execution of jobs defined according to job definitions; and includes a display control unit that controls the display of a user interface (UI) screen meant for receiving user operations, and includes a job executing unit that executes jobs according to user operations performed using the UI screen and that records a job execution history. The display control unit displays a job definition list in the UI screen and, when any one job definition is selected from the job definition list, displays, in the UI screen, one or more already-executed jobs as input candidates that can be used as the input for the job to be executed according to the selected job definition. When an already-executed job is selected from among the input candidates, the job executing unit uses the output of the selected already-executed job as the input and executes the job according to the job definition selected from the job definition list.

The embodiments of the job execution control device, a job execution method, and a recording medium are described below in detail with reference to the accompanying drawings.

Brief Overview of Embodiments

The job execution control device according to the embodiments can be implemented as, for example, a server of a server-client system built using a network. In that case, the job execution control device displays a UI screen, which is meant for receiving user operations, in a display unit of a client terminal of the user via a browser installed in the client terminal; and executes jobs according to the user operations performed using the UI screen.

Regarding each job executed by the job execution control device according to the embodiments, the operation details are written in a job definition. Herein, the job definition is configured using a job type that represents an identifier added to the job; an input argument that is meant for receiving input from outside; and a script that indicates the operation details. The processing result of a job is output as a file to a directory (work directory) that is provided separately for each executed job. The input argument is assigned according to the user operation performed using the UI screen. Examples of the type of the input argument include the output of another already-executed job or a specific value such as a character string or file path. When the input argument represents the output of another job, the work directory of that other job is provided in the script.

In the job execution control device according to the embodiments, a job is executed using the input argument provided according to the user operation, which is performed using the UI screen, and using the script of the specified job definition; the output of the job is stored in the work directory; and the job execution history is recorded. The job execution history includes the job definitions of the already-executed jobs (including the jobs waiting to be executed and the jobs being executed), the argument provided as input, the output result, the completion time, and the state of the job (such as non-executable, waiting to be executed, being executed, terminated, completed, or failed). The job execution history is recorded and stored in a database in a separate manner from the corresponding work directory and the file group included in the work directory.

With reference to a series of jobs performed for generating and evaluating a dictionary for speech recognition, given below is the explanation of a specific example of a configuration and operations of the job execution control device according to the embodiment. A dictionary for speech recognition is generated from an acoustic model that analyzes the feature quantity related to the acoustics, and from user words representing proper nouns included in the uttered text; and is used by a speech recognition engine for speech-to-text conversion. Herein, the user words are mandatory, and can be added later to an already-created dictionary.

An acoustic model is generated based on the set including a speech and the transcript obtained by manual conversion of the speech into a text. The user words are generated based on the named entities extracted from the speech-related document as a result of natural language analysis. The set including the speech and the transcript is also used as performance evaluation data of the dictionary; and the speech recognition result and the character accuracy rate of the transcript are used as the evaluation result. Meanwhile, the jobs that can be handled in the job execution control device according to the embodiments are not limited to the jobs mentioned in the following explanation.

First Embodiment

FIG. 1 is a block diagram illustrating an exemplary functional configuration of a job execution control device 10 according to a first embodiment. As illustrated in FIG. 1, the job execution control device 10 includes a display control unit 11, a job executing unit 12, a job execution history searching unit 13, a job definition graph generating unit 14, a job definition storing unit 15, a job execution history storing unit 16, and a job result storing unit 17.

The display control unit 11 controls the display of the UI screen meant for receiving user operations. Regarding the details of specific examples of the UI screen, the explanation is given later. Moreover, the display control unit 11 has the function of sending operation information, which is obtained according to the user operations performed using the UI screen, to the job executing unit 12 and the job definition graph generating unit 14.

The job executing unit 12 executes a job according to a user operation performed using the UI screen, as well as records the job execution history and stores it in the job execution history storing unit 16.

The job execution history searching unit 13 searches the job execution history storing unit 16 for the job execution history to be used for the purpose of displaying a job history graph (described later) in the UI screen and displaying already-executed jobs representing input candidates.

The job definition graph generating unit 14 generates, when the user specifies a partial range from the job history graph displayed in the UI screen, a job definition graph indicating a job definition group that corresponds to the already-executed jobs included in that range and indicating the input-output relationship of each job definition.

The job definition storing unit 15 is used to store the job definitions generated in advance. Moreover, when the job definition graph generating unit 14 generates a job definition graph, it also gets stored in the job definition storing unit 15.

In FIG. 2 is illustrated an example of a job definition. The job definition illustrated in FIG. 2 is the job definition of a related-document registration job. The job definition mainly contains three categories of information, namely, 'type', 'input', and 'script'. Under the 'type' category, following information is specified: a 'name' representing an identifier that itself serves as information about the identifier added to the job; and a 'description' representing the display name in the UI screen. Under the 'input' category, following information is specified as the argument provided as the input: an argument name 'documents_dir'; a 'type' indicating the type of the argument and serving as information about the argument; and a 'description' indicating the display name in the UI screen and serving as information about the argument. The 'type' of the argument can be one of the following: a 'path' in which the path of a file serves as the input; a 'job' in which the output (processing result) of another job serves as the input; and a 'string' in which a character string serves as the input. Under the 'script' category, the operation to be executed in the concerned job is specified. In the job definition illustrated in FIG. 2, the 'script' category is written using commands written in bash. Herein, a '$documents_dir' and a '$workdir' represent variables, and the concerned job is executed after the corresponding input argument is substituted with the path of the work directory of the job.

In FIG. 3 is illustrated the job definition of a user word generation job. Regarding an argument 'documents_data_job' of the user word generation job, a 'type' represents a 'job' thereby indicating that the output of another job is received as the input. Moreover, a 'job_type' is mentioned for enabling specification of the job type that is receivable at that time.

In FIG. 4 is illustrated the job definition of a dictionary accuracy evaluation job. In this job definition, a plurality of input arguments is written in the 'input' category. Moreover, when an argument having the 'type' of 'job' is capable of receiving a plurality of job types, an array of the job types is written. Furthermore, in an 'output' category, a bash script is written for the purpose of outputting the processing result of the concerned job. When the job is executed according to the job definition that includes the description of the 'output' category, a standard output result of executing the script of the 'output' category is recorded as the output of the concerned job. In the job definition illustrated in FIG. 4, it is indicated that a file 'precision.json' that is output by an eval command in the 'script' category is output as the standard output.

In FIG. 5 is illustrated the job definition of a dictionary generation job. In the dictionary generation job, a plurality of inputs is received in an identical manner to the dictionary accuracy evaluation job. In the job definition illustrated in FIG. 5, an argument 'user_words_data_job" has a 'optional: true' specified therein, and accordingly it is indicated that the argument is an arbitrary argument and that the job is executable even when the input is not provided.

When an input argument written that is written in the 'input' category of a job definition as described above is provided as the input, the job executing unit 12 can execute the job according to that job definition.

The job execution history storing unit 16 is used to store the job execution history. In FIG. 6 is illustrated an example of the job execution history stored in the job execution history storing unit 16. For example, as illustrated in FIG. 6, the job execution history includes the following items: ID (job ID) for enabling unique identification of an already-executed job (including a job waiting to be executed or a job being executed); job definition of the already-executed job; input; output; completion time; and state.

The job definition is identified by the 'name' of the 'type' category written therein. In the completion time, the date and time of completion of the job is recorded. However, in FIG. 6, only the completion date is illustrated. The state indicates the state of the job from one of the following: a non-executable state indicating that the job is not executable because the input thereto is not available; a waiting to be executed state indicating that the execution of the job is awaited; a being executed state indicating that the execution of the job has started but has not completed; a terminated state indicating that the execution of the job was terminated; a completed state indicating that the execution of the job was completed; and a failed state indicating that the execution of the job ended up in failure.

The input represents the values of input arguments specified using JSON. In FIG. 7 is illustrated an exemplary input for the related-document registration job. In the example illustrated in FIG. 7, with respect to the argument 'documents_dir', a path '/work/marketing/meetings/' is specified. In FIG. 8 is illustrated an exemplary input for the dictionary accuracy evaluation job. In the example illustrated in FIG. 8, with respect to each argument having the 'type' category of 'job', the input is specified using the job ID.

The output represents the standard output result output from the 'output' category when the 'output' category is written in the job definition, and is expressed using JSON in an identical manner to the input. In FIG. 9 is illustrated an exemplary output of the dictionary accuracy evaluation job. In the example illustrated in FIG. 9, the character accuracy rate is indicated using a property name 'precision'.

The job result storing unit 17 is used to store the processing result (output) of the job executed by the job executing unit 12. The processing result of the job is output as a file to a work directory generated in the job result storing unit 17, and thus gets stored in the job result storing unit 17.

Given below is the explanation of the operations performed by the job execution control device 10 according to the first embodiment. As described above, the job execution control device 10 according to the first embodiment executes jobs according to user operations performed using the UI screen. The execution of jobs is performed in order from the jobs which are in the standby state for execution and for which the input is available. When the output of another job is used as the input for a particular job, the execution of the particular job cannot be carried out until the execution of the other job is completed. In the following explanation, it is assumed that a job in the standby state for execution uses the output of another job as the input, and the explanation is given about the operations performed by the job execution control device 10 at the time of executing the concerned job.

FIG. 10 is a flowchart for explaining an exemplary sequence of operations performed by the job execution control device 10 according to the first embodiment at the time of executing a job. The sequence of operations in the flowchart illustrated in FIG. 10 is performed in a repeated manner at regular intervals by the job executing unit 12 of the job execution control device 10.

When the operations in the flowchart illustrated in FIG. 10 are started, the job executing unit 12 firstly refers to the job execution history stored in the job execution history storing unit 16, and confirms whether or not there is any job in the standby state for execution (i.e., a job waiting to be executed) (Step S101). If there is no job waiting to be executed (No at Step S101), then the job executing unit 12 changes the state of the jobs having the non-executable state in the job execution history to jobs having the standby state for execution (Step S102), and ends the operations.

When there is a job waiting to be executed (Yes at Step S101), the job executing unit 12 confirms whether or not the other jobs (i.e., input jobs) that are to be used as the input for the job waiting to be executed are in the completed state (Step S103). If the other jobs are not in the completed state (No at Step S103), then the job executing unit 12 changes the state of the job waiting to be executed to the non-executable state (Step S104). Then, the system control returns to Step S101 and the job executing unit 12 repeatedly performs the operations from Step S101 onward.

If the input jobs have been completed (Yes at Step S103), then the job executing unit 12 changes the state of the job waiting to be executed to the state of being executed (Step S105), and generates a work directory in the job result storing unit 17 (Step S106). Then, the job executing unit 12 obtains the input required for executing the job (Step S107), and substitutes the values obtained in Step S107 for the input variables in the script written in the job definition (Step S108). Subsequently, the job executing unit 12 executes the script (Step S109), and performs an operation for obtaining the output if necessary (Step S110).

Then, the job executing unit 12 changes the state of the job to the completed state (Step S111). Subsequently, the system control returns to Step S101 and the job executing unit 12 repeatedly performs the operations from Step S101 onward. Meanwhile, in case there is failure in the execution of the script, the job executing unit 12 changes the state of the job to the failed state. Meanwhile, the input and the output of the job are reflected in the job execution history as may be necessary. As far as the execution of the script is concerned, the execution is carried out in a concurrent manner to the operations in the flowchart illustrated in FIG. 10. Hence, a plurality of scripts can be executed at the same time.

Given below is the explanation of a specific example of the UI screen that receives user operations related to the execution of a job and a specific example of the user operations performed using the UI screen. As described earlier, the display on the UI screen is controlled by the display control unit 11. In the first embodiment, as the UI screen that is subjected to display control by the display control unit 11, various types of the UI screen are assumed, such as a job definition list UI, a job execution UI, a job history UI, a job details UI, and a subsequent job execution UI.

Figure 11:
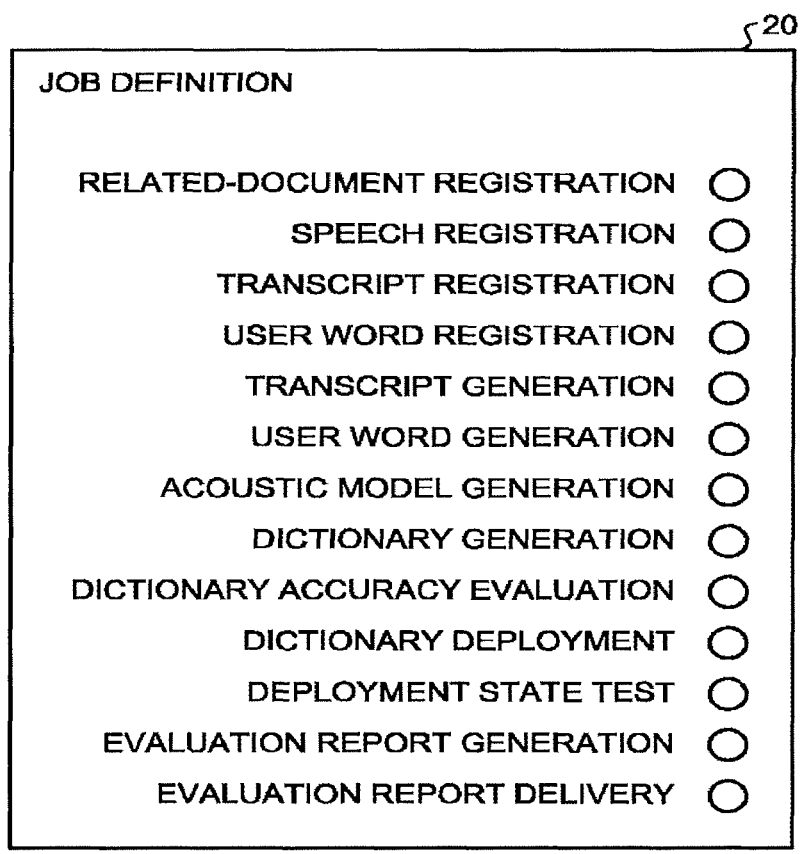
FIG. 11 is a diagram illustrating an example of a job definition list UI.

FIG. 11 is a diagram illustrating an example of a job definition list UI 20. As illustrated in FIG. 11, the job definition list is displayed in the job definition list UI 20. More particularly, a list of 'description' of the 'type' category of the job definitions stored in the job definition storing unit 15 is displayed.

From among the job definitions displayed in the job definition list UI 20 illustrated in FIG. 11, the related-document registration represents the job definition of a job (a related-document registration job) meant for registering a document such as a presentation material related to the target speech for recognition. A related document is used for extracting the named entities required for the enhancement of speech recognition accuracy. Moreover, the speech registration represents the job definition of a job (a speech registration job) meant for registering the speech required in acoustic model generation or in evaluation data. Furthermore, the transcript registration represents the job definition of a job (a transcript registration job) meant for registering the set including a registered speech and the text of the corresponding transcript. Moreover, the user word registration represents the job definition of a job (a user word registration job) meant for registering the user words to be used at the time of generating or evaluating a dictionary. A user word is made of named entities not included in the standard word dictionary.

Furthermore, the transcript generation represents the job definition of a job (a transcript generation job) meant for generating, with the use of speech recognition, a text corresponding to a speech serving as the input, and meant for setting the set including the text and the speech as the transcript. Moreover, the acoustic model generation represents the job definition of a job (an acoustic model generation job) meant for generating an acoustic model, with the transcript serving as the input. Furthermore, the dictionary generation represents the job definition of a job (a dictionary generation job) meant for generating a dictionary for speech recognition, with the acoustic model and the user words serving as the input.

Moreover, the dictionary accuracy evaluation represents the job definition of a job (a dictionary accuracy evaluation job) meant for performing accuracy evaluation, with the dictionary and the transcript serving as the input. The accuracy is calculated by comparing the result of speech recognition, which is performed with respect to the speech in the transcript using the dictionary, with the transcript text. Furthermore, the dictionary deployment represents the job definition of a job (a dictionary deployment job) meant for deploying the input dictionary to a particular server. Moreover, the deployment state test represents the job definition of a job (an deployment state test job) meant for testing whether a speech recognition operation using the deployed dictionary can be performed. Furthermore, the evaluation report generation represents the job definition of a job (an evaluation report generation job) meant for generating a user-friendly report, with the result of the dictionary accuracy evaluation job serving as the input. Moreover, the evaluation report delivery represents the job definition of a job (an evaluation report delivery job) meant for delivering the report to particular users using electronic mail.

In the job definition list UI 20, for example, as illustrated in FIG. 11, a node is displayed corresponding to each job definition and, when the user clicks on any one node, the job definition corresponding to that node gets selected. Then, the screen changes to the job execution UI meant for executing the job according to the selected job definition.

Figure 12:
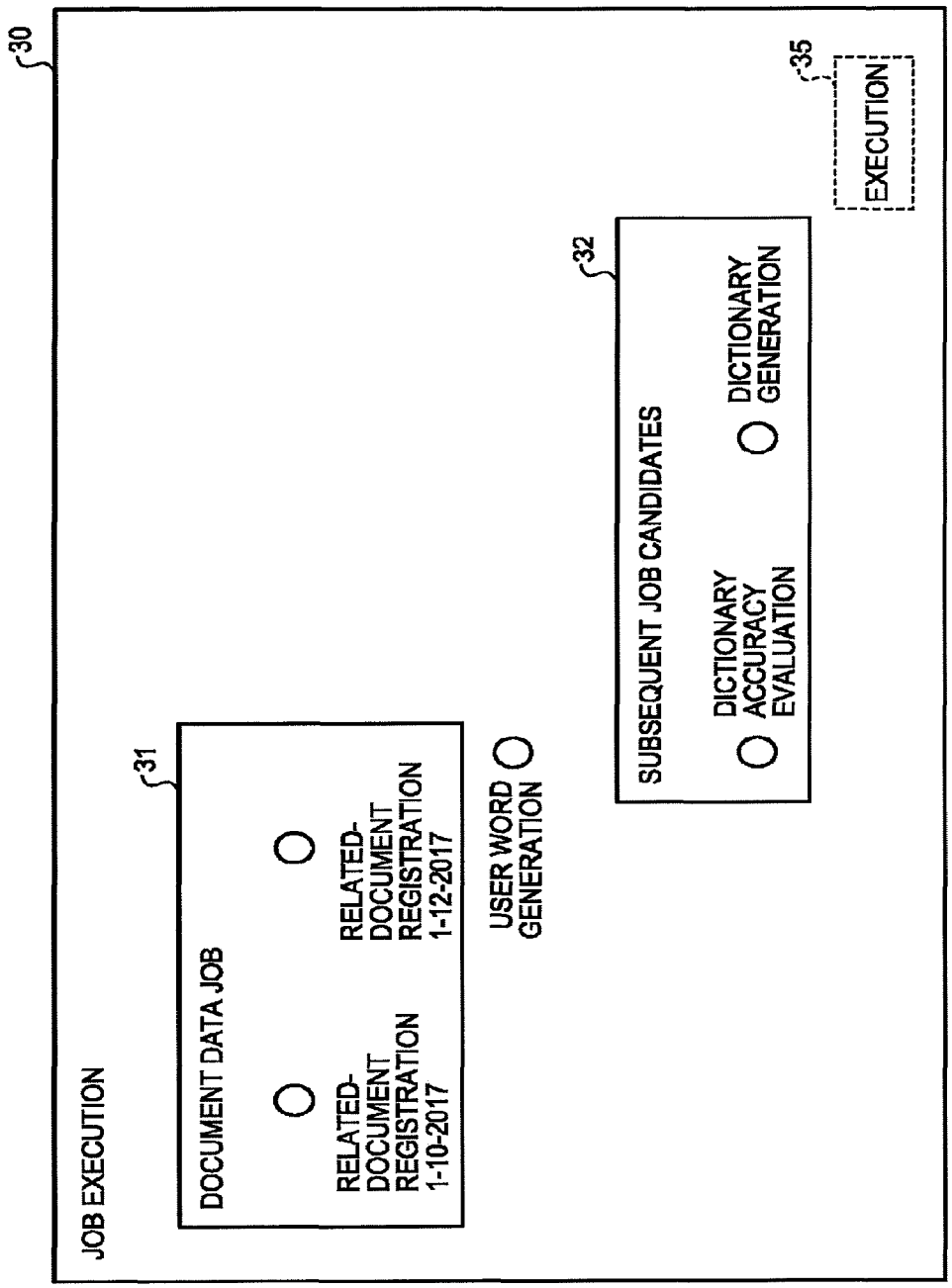
FIGS. 12 to 15 are diagrams illustrating examples of a job execution UI.

FIG. 12 is a diagram illustrating an example of a job execution UI 30, and illustrating an example of the case when the job definition of the user word generation job is selected from the job definition list UI 20 illustrated in FIG. 11. In the job execution UI 30, as illustrated in FIG. 12, along with the display of the node of the job definition selected from the job definition list UI 20, a group of already-executed jobs that are usable as the input for the job to be executed according to the selected job definition is displayed as input candidates 31. In the job execution UI 30 illustrated in FIG. 12, in order to select a document data job that is required as an input argument in the user word generation job, related-document registration jobs that are already executed are displayed as the input candidates 31. Each already-executed job included in the input candidates 31 is illustrated using a node in an identical manner to the job definition selected from the job definition list UI 20.

The already-executed jobs that are displayed as the input candidates 31 are obtained by the job execution history searching unit 13 by searching the job execution history storing unit 16. As a result of performing the search, a specified number of sets of job execution history are obtained in the reverse chronological order of the completion date and time, with the 'job_type' of the input jobs serving as the filter; and the already-execution jobs represented by those sets of job execution history are displayed as the input candidates 31 in the job execution UI 30. Moreover, a button can be provided for displaying the already-executed jobs that are older than the specified number. Meanwhile, when it is necessary to use the input other than the input having the 'type' category of 'job', UIs meant for performing such input, such as a file selection form with respect to the 'path' and a textbox with respect to the 'string', are separately displayed.

Moreover, in the job execution UI 30, a group of such job definitions which can use, as the input thereto, the output of the job executed according to the job definition selected from the job definition list UI 20 is displayed as subsequent job candidates 32 (first subsequent job candidates). In the job execution UI 30 illustrated in FIG. 12, the dictionary accuracy evaluation and the dictionary generation, which represent the job definitions capable of using the output of the user word generation job as the input thereto, are displayed as the subsequent job candidates 32. The job definitions included in the subsequent job candidates 32 are illustrated using nodes in an identical manner to the job definition selected from the job definition list UI 20 and the already-executed jobs included in the input candidates 31.

In the job execution UI 30, with the aim of setting the input for the job definition selected from the job definition list UI 20, the user can perform, for example, a drag-and-drop operation using a mouse and connect the node of any one already-executed job included in the input candidates 31 with the node of the job definition selected from the job definition list UI 20. Moreover, when the subsequent job is to be executed, identical operations are performed to connect the node of the job definition selected from the job definition list UI 20 with the node of any one job definition included in the subsequent job candidates 32, so that the subsequent job to be executed can be selected and the input for that job can be set.

Figure 13:
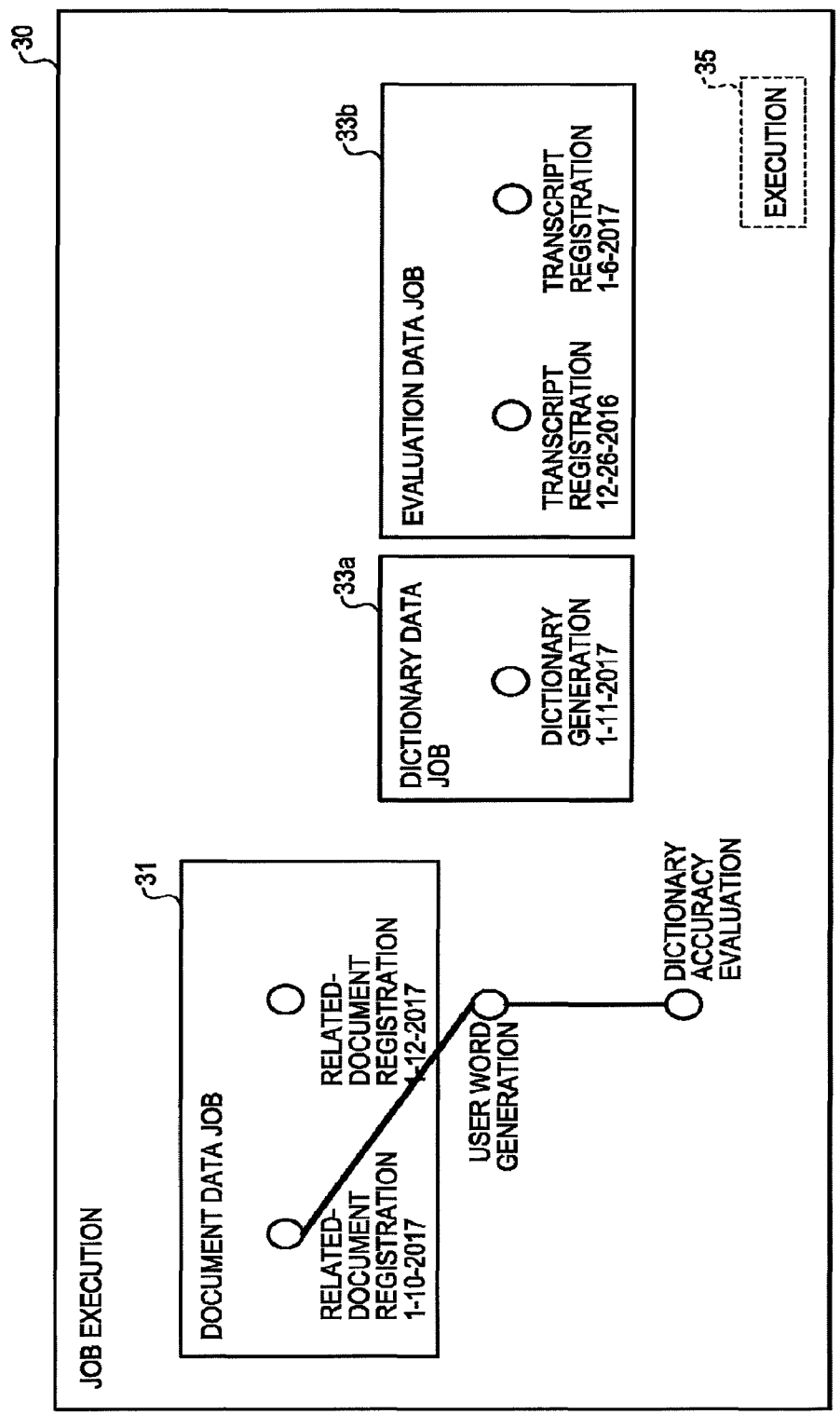

In FIG. 13 is illustrated the job execution UI 30 in the state in which the following nodes are connected: the node of the related-document registration job that has been completed on Jan. 10, 2017 and that is included in the input candidates 31; the node of the job definition selected from the job definition list UI 20 (i.e., the user word generation); and the node of the dictionary accuracy evaluation included in the subsequent job candidates 32. Herein, the dictionary accuracy evaluation selected as the subsequent job requires the output of the user word generation job as well as requires two arguments, namely, a dictionary data job and an evaluation data job. Hence, a group of already-executed dictionary generation jobs and a group of already-executed transcript registration jobs are newly displayed as input candidates 33a and 33b, respectively, for the subsequent job.

Figure 14:
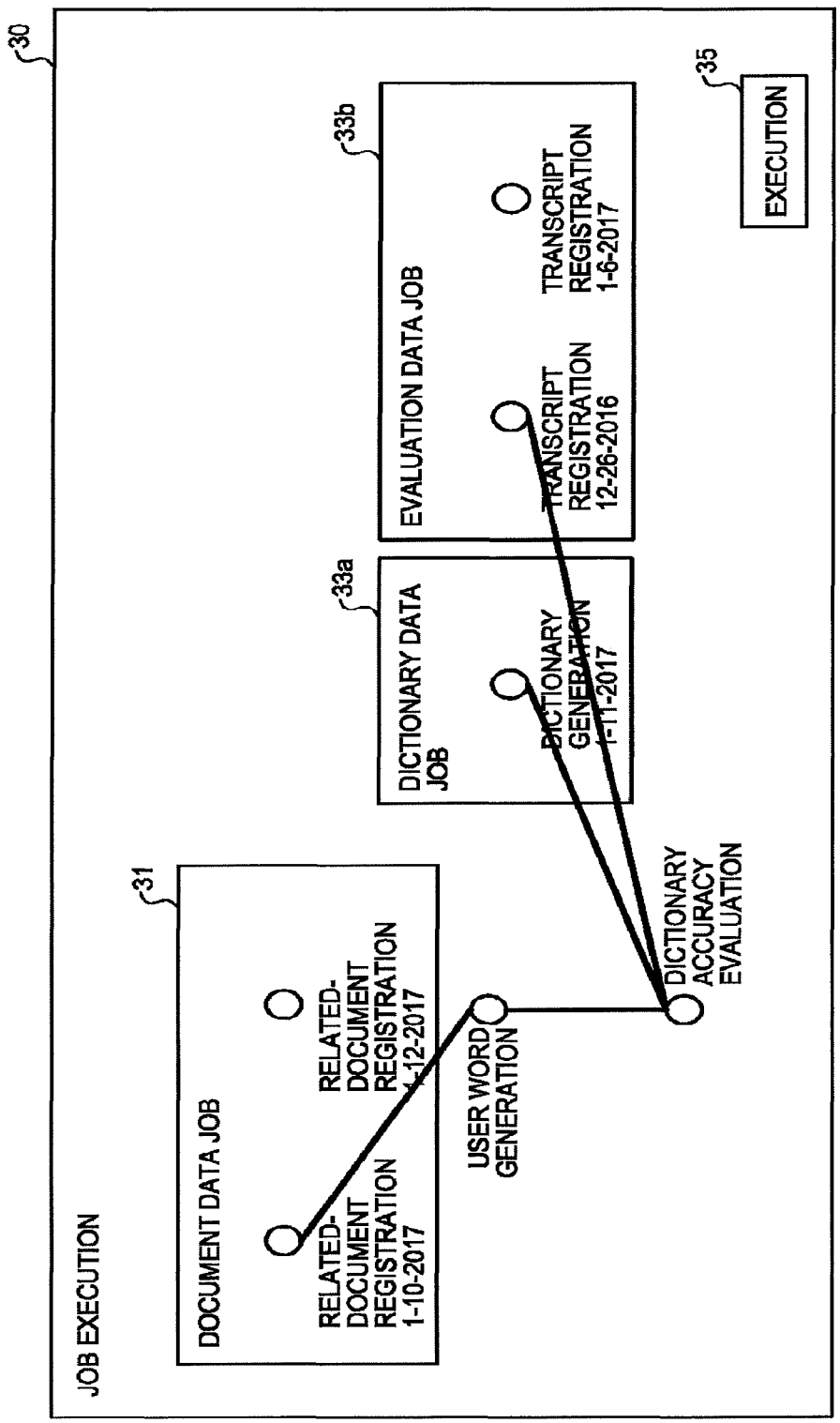

In FIG. 14 is illustrated the job execution UI 30 in the state in which the node of the dictionary generation job that has been completed on Jan. 11, 2017 and that is included in the input candidates 33a as well as the node of the transcript registration job that has been completed on Dec. 26, 2016 and that is included in the input candidates 33b is connected to the node of the dictionary accuracy evaluation job selected as the subsequent job. In this state, since the setting of the input for the user word generation job and the input for the dictionary accuracy evaluation job has been completed, when an "execution" button 35 displayed in the job execution UI 30 is clicked, the user word generation job and the dictionary accuracy evaluation job are sequentially executed using the respective inputs.

The job history UI is meant for displaying a job history graph in which a plurality of already-executed jobs (jobs being executed or jobs waiting to be executed) having an input-output relationship therebetween represents nodes, and in which the nodes are connected by edges. The edge between each pair of nodes represents the input-output relationship between the already-executed jobs corresponding to the concerned nodes.

Figure 15:
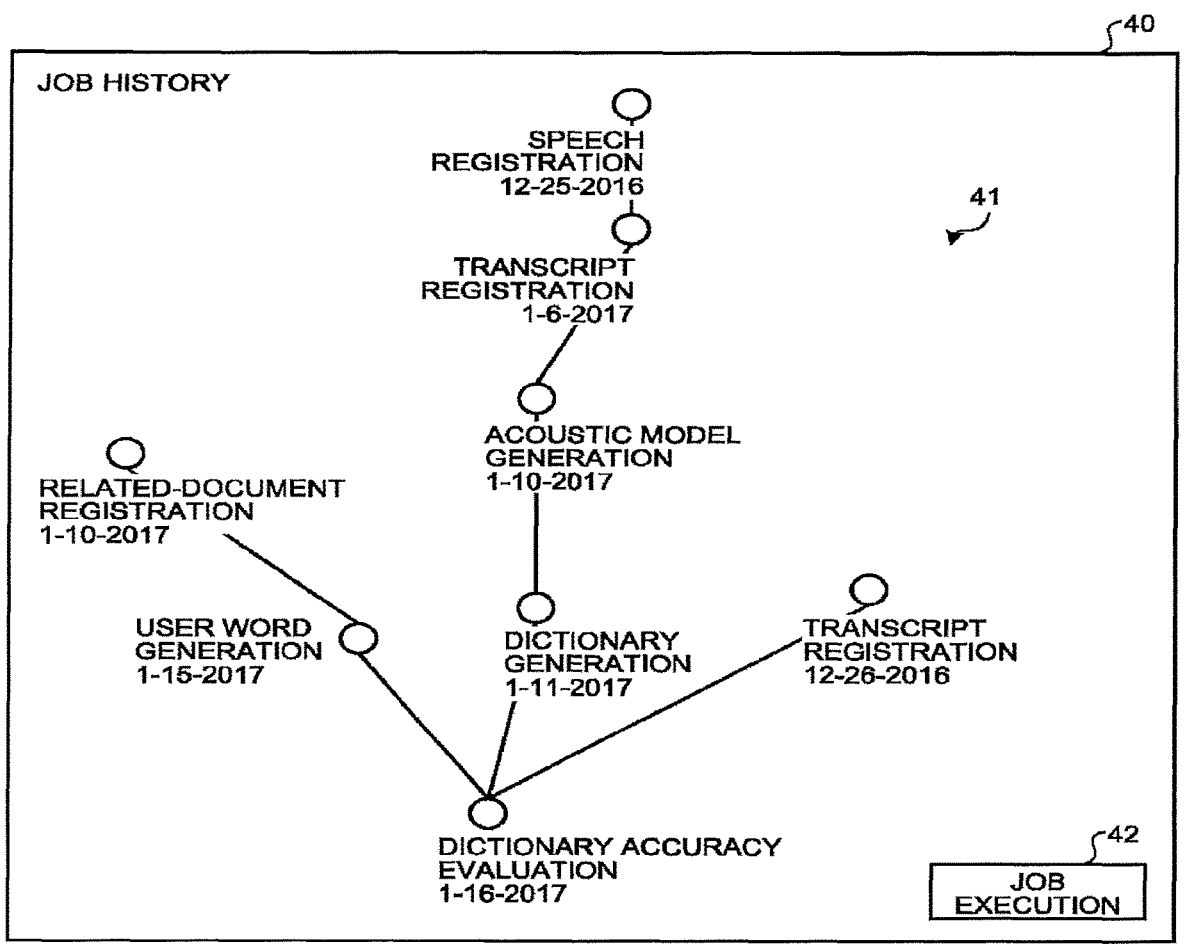

FIG. 15 is a diagram illustrating an example of a job history UI 40. As illustrated in FIG. 15, a job history graph 41 is displayed in the job history UI 40. At each node of the job history graph 41, the 'description' of the 'type' category of the corresponding already-executed job is displayed along with the completion time of the corresponding already-executed job. When the job corresponding to a node is a job being executed or a job waiting to be executed, the state of that job is displayed in place of the completion time.

For example, the job history UI 40 can be used, for example, as a UI screen that is initially displayed after the user performs login. In that case, for example, the nodes included in the job history graph 41 are decided by performing the following operations until there is no more space for arranging the nodes in the screen: obtaining a single already-executed job having the latest completion time in the job execution history; obtaining another already-executed job that was used as the input for the concerned already-executed job; obtaining still another already-executed job that was used as the input for the other already-executed job; and so on. Moreover, the display range can be changed by dragging the screen, so that the nodes having still older completion time can be displayed. Furthermore, the configuration can be done to enable reception of a user specification about the date and time and enable adjustment in such a way that the node of the already-executed job having the closest completion time to the specified date and time is displayed in the center. Meanwhile, in the job history UI 40, a "job execution" button 42 is displayed along with the job history graph 41. When the "job execution" button 42 is clicked, the job definition list UI 20 is called.

Figure 16:
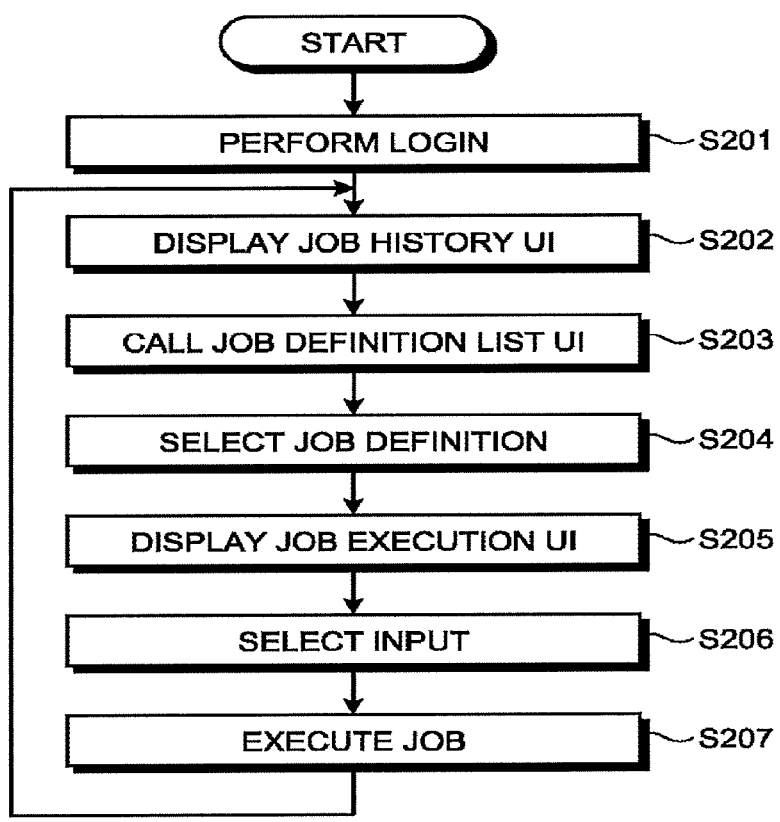
FIG. 16 is a flowchart for explaining an exemplary sequence of operations performed by the user at the time of executing a job.

FIG. 16 is a flowchart for explaining an exemplary sequence of operations performed by the user at the time of executing a job using the job history UI 40, the job definition list UI 20 and the job execution UI 30. When the user performs login using account information, the use of the job execution control device 10 according to the first embodiment is started.

When the user performs login (Step S201), firstly the job history UI 40 gets displayed (Step S202). In the job history UI 40, when the user clicks the "job execution" button 42, the job definition list UI 20 is called (Step S203).

From the job definition list displayed in the job definition list UI 20, when the user selects an arbitrary job definition (Step S204), the job execution UI 30 gets displayed (Step S205). Subsequently, when the user selects the necessary input in the job execution UI 30 and clicks the "execution" button 35 (Step S206), the job gets executed (Step S207). In this way, when a job is executed according to the user operations performed in the job execution UI 30, as soon as the execution of the job starts, the display returns to the job history UI 40 in which the job history graph 41 beginning from the job being executed or a job waiting to be executed is displayed.

As described earlier, the job execution control device 10 according to the first embodiment is assumed to operate in a browser installed in a client terminal. Thus, the user can perform the operation of closing the browser at an arbitrary timing, and stop using the job execution control device 10 according to the first embodiment.

Figure 17:
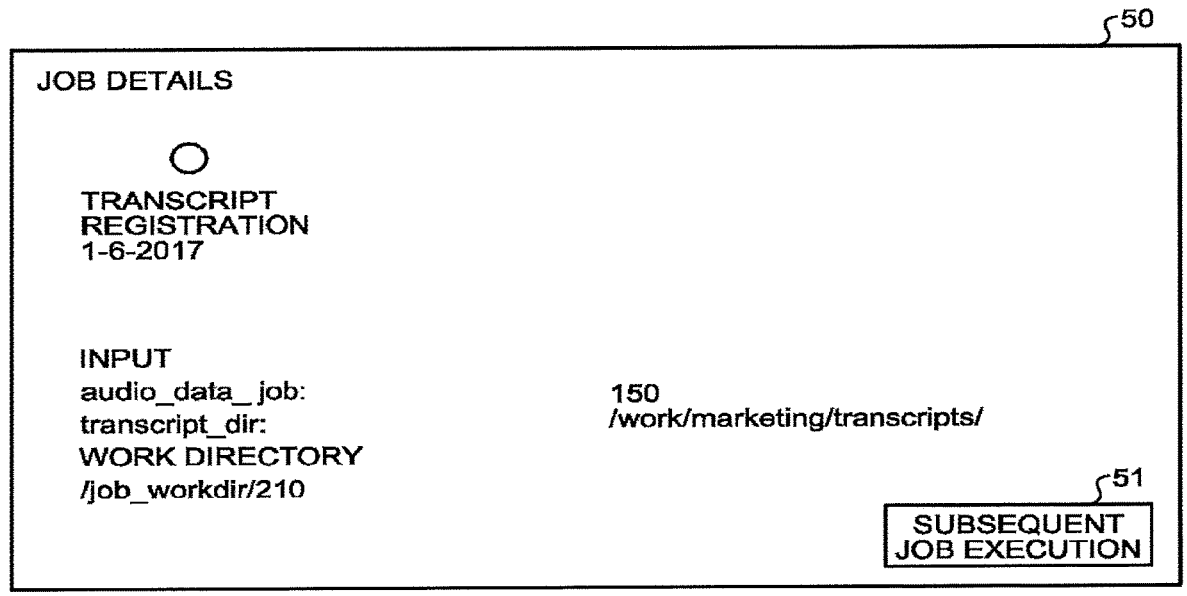
FIG. 17 is a diagram illustrating an example of a job details UI.

When any one node included in the job history graph 41 in the job history UI 40 is clicked, the screen changes to a job details UI in which the input or the work directory for the already-executed job corresponding to that node can be confirmed. In FIG. 17 is illustrated an example of the job details UI. The job details UI 50 illustrated in FIG. 17 is an example of the job details UI that is displayed when the node of a transcript registration job completed on Jan. 6, 2017 is selected from the job history graph 41 in the job history UI 40 illustrated in FIG. 15.

In the job details UI 50, as illustrated in FIG. 17, a "subsequent job execution" button 51 is displayed in addition to the display of the input and the work directory for the already-executed job selected from the job history graph 41. When the "subsequent job execution" button 51 is clicked, the screen changes to a subsequent job execution UI meant for enabling execution of another job using, as the input, the output of the already-executed job displayed in the job details UI 50.

Figure 18:
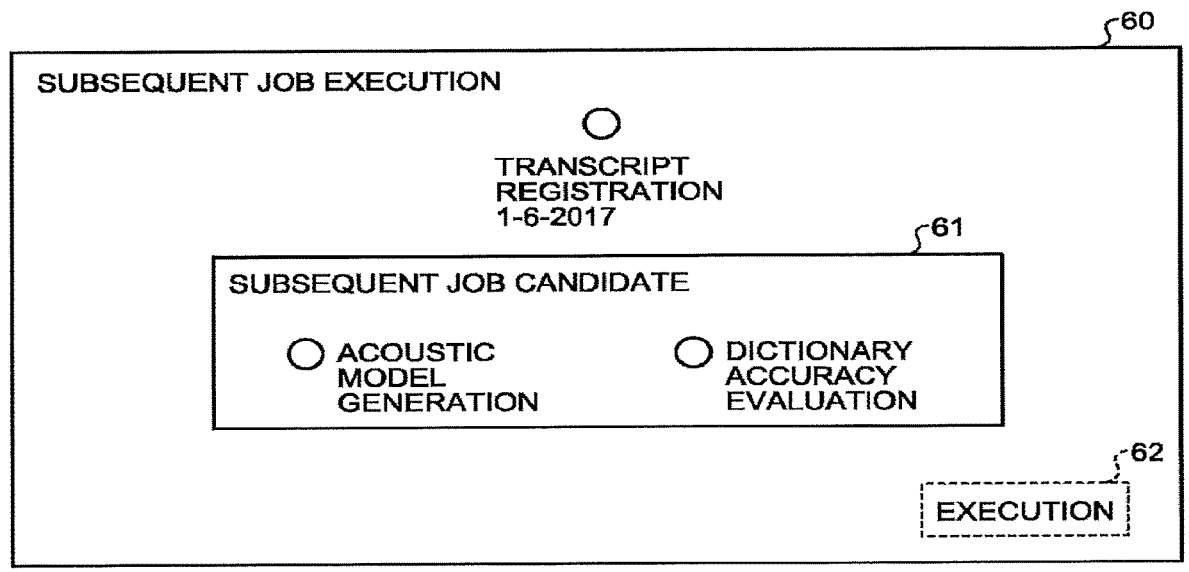
FIG. 18 is a diagram illustrating an example of a subsequent job execution UI.

FIG. 18 is a diagram illustrating an example of a subsequent job execution UI 60. As illustrated in FIG. 18, in the subsequent job execution UI 60, the node of the already-executed job selected from the job history graph 41 is displayed along with subsequent job candidates 61 (second subsequent job candidates) that include a group of job definitions in which the output of the concerned already-executed job is usable as the input. In the subsequent job execution UI 60 illustrated in FIG. 18, the acoustic model generation and the dictionary accuracy evaluation, which represent the job definitions in which the output of the transcript registration job is usable as the input, are displayed as the subsequent job candidates 61.

The job definitions included in the subsequent job candidates 61 are expressed using nodes in an identical manner to the already-executed job selected from the job history graph 41. In the subsequent job execution UI 60, the user can perform, for example, a drag-and-drop operation using a mouse and connect the node of the already-executed job selected from the job history graph 41 with the node of any one job definition included in the subsequent job candidates 61, and can select the subsequent job to be executed and set the input for that subsequent job. When the input for the subsequent job is set, an "execution" button 62 becomes operable. When the "execution" button 62 is clicked, the subsequent operation gets executed.

Moreover, in the job history UI 40, when an operation of selecting a partial range of the job history graph 41 is performed, the job definition graph generating unit 14 generates a job definition graph corresponding to the selected range. The job definition graph is meant for executing a series of job groups in a single job execution operation, and represents a job definition group corresponding to each node included in the range selected by the job history graph 41 and represents the input-output relationship of each job definition.

Figure 19:
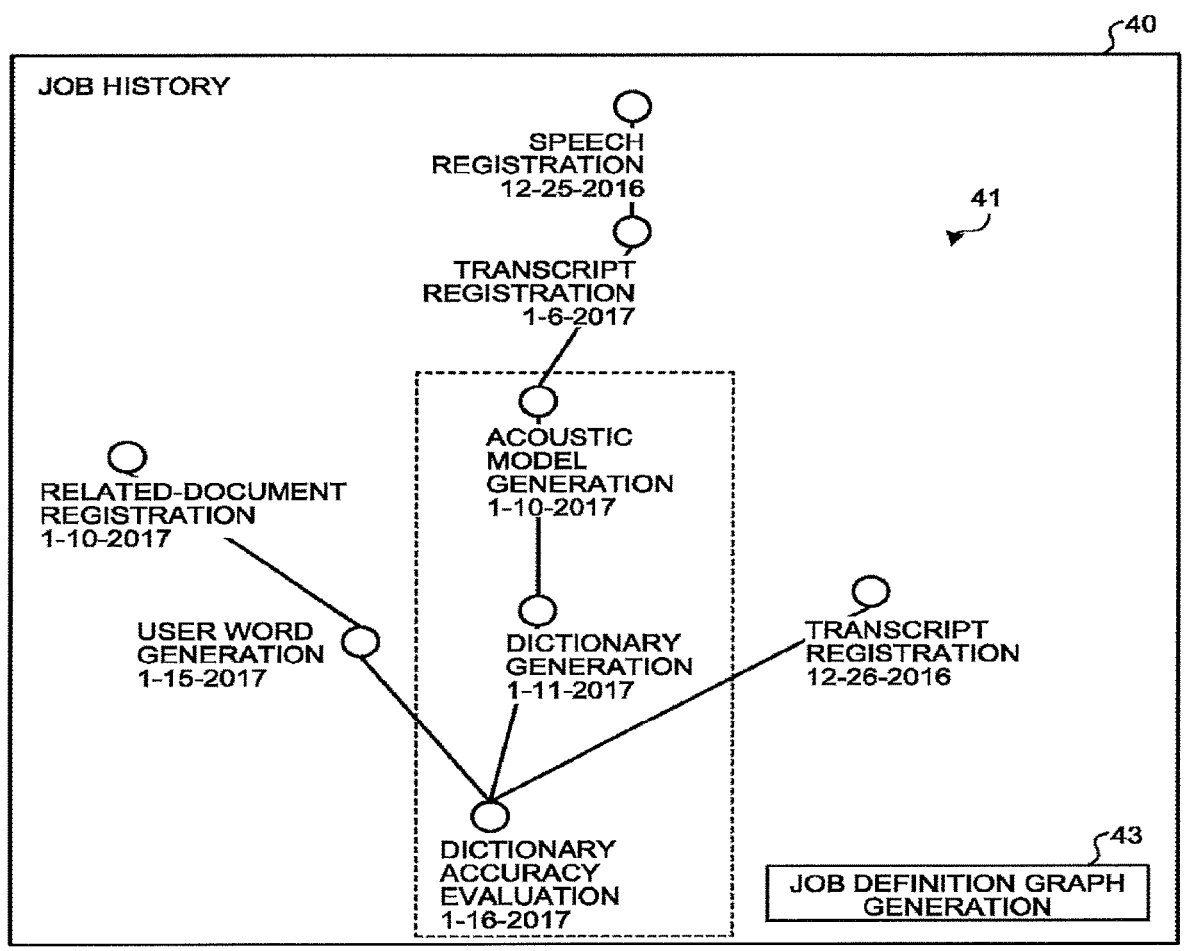
FIG. 19 is a diagram illustrating a job history UI in the state in which a partial range of a job history graph is selected.

In FIG. 19 is illustrated the job history UI 40 in the state in which a partial range of the job history graph 41 is selected. The user can perform, for example, a dragging operation using a mouse and select a desired range (for example, the range enclosed by dashed lines in FIG. 19) of the job history graph 41. The operation of selecting a partial range of the job history graph 41 can be performed according to some other method such as clicking on a plurality of nodes while keeping the shift key of the keyboard pressed. When a partial range of the job history graph 41 is selected, a "job definition graph generation" button 43 gets displayed in the job history UI 40. When the "job definition graph generation" button 43 is clicked, a job definition graph gets generated that represents the job definition groups corresponding to each node included in the selected range and represents the input-output relationship of job definition groups.

Figures 20, 21:
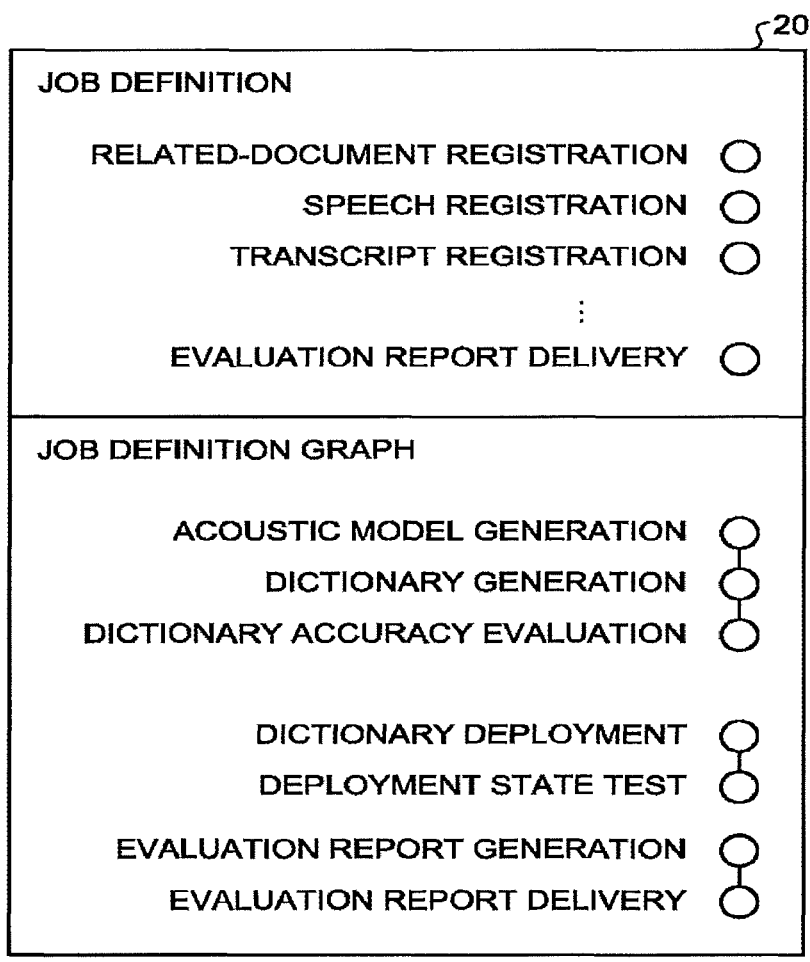
FIG. 20 is a diagram illustrating an exemplary data structure of a job definition graph.
FIG. 21 is a diagram illustrating an example of the job definition list UI in which a job definition list including a job definition graph is displayed.

In FIG. 20 is illustrated an exemplary data structure of the job definition graph. The job definition graph is defined as a list of job definition groups corresponding to each node included in the range selected from the job history graph 41. For example, as illustrated in FIG. 20, the data of the job definition graph includes the job definition corresponding to each node, an array of IDs of nodes used as the input for the concerned node, and an array of IDs of the nodes that make use of the output from the concerned node.

When the job definition graph is generated, the data of that job definition graph gets stored in the job definition storing unit 15. Subsequently, at the time of displaying the job definition list UI 20, the data of the job definition graph is read from the job definition storing unit 15, and a job definition list including the job definition graph gets displayed in the job definition list UI 20. In FIG. 21 is illustrated an example of the job definition list UI 20 in which a job definition list including a job definition graph is displayed. In the job definition list UI 20 illustrated in FIG. 21, not only the job definitions are selectable but the job definition graph generated by the job definition graph generating unit 14 is also selectable.

Figure 22:
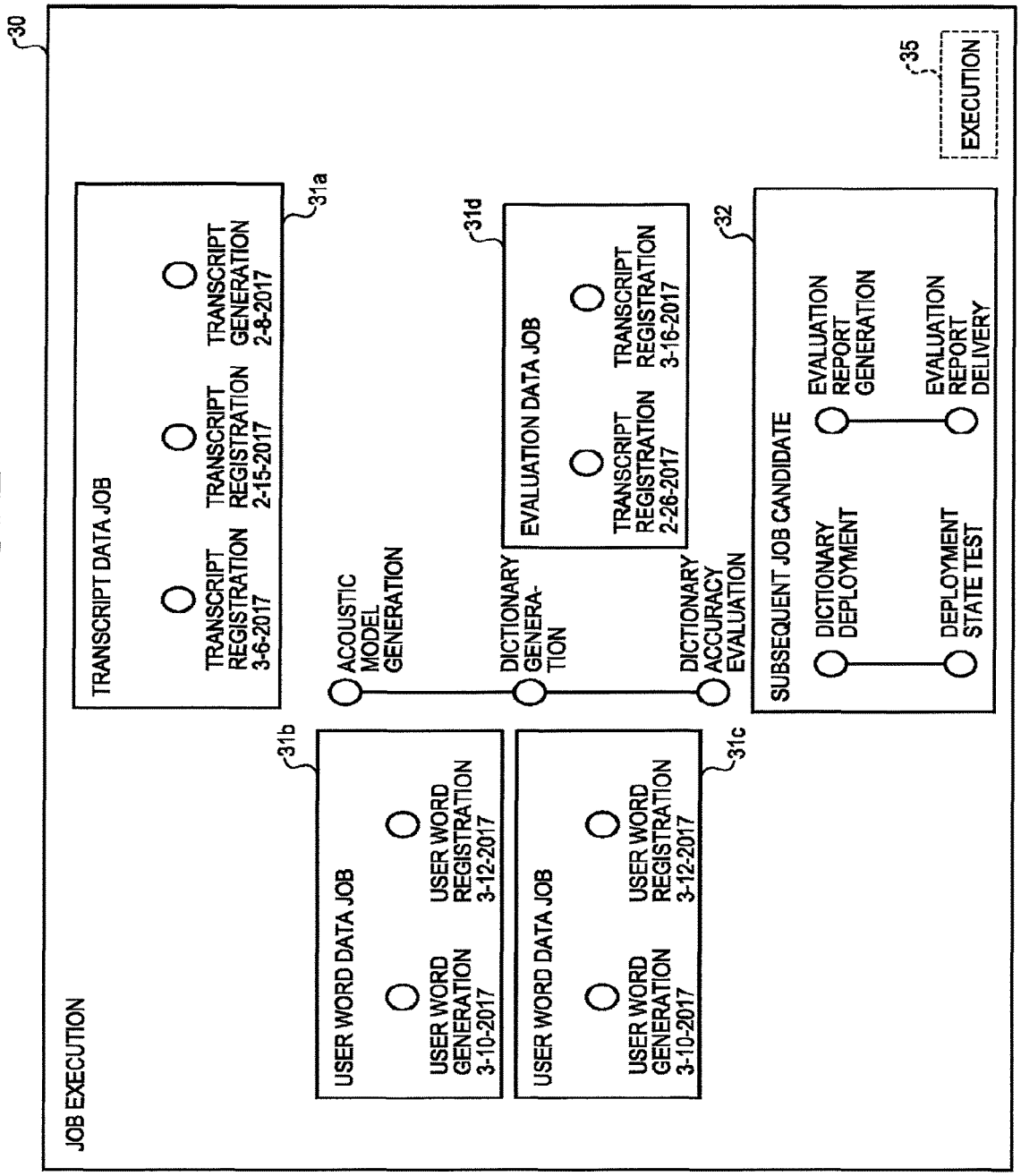
FIG. 22 is a diagram illustrating an example of the job execution UI that is displayed when the job definition graph is selected from the job definition list UI.

In FIG. 22 is illustrated an example of the job execution UI 30 that is displayed when the job definition graph is selected from the job definition list UI 20. Although the job execution UI 30 illustrated in FIG. 22 is identical to the job execution UI 30 that is displayed when a job definition is selected from the job definition list UI 20 (see FIG. 12), the nodes of the already-executed job groups that are usable as the input for the nodes of the job definition graph are displayed as input candidates 31$a$, 31$b$, 31$c$, and 31$d$. The input candidates 31$a$ represent the already-executed job group usable as the input for the acoustic model generation job. The input candidates 31$b$ represent the already-executed job group usable as the input for the dictionary generation job. The input candidates 31$c$ and 31$d$ represent the already-executed job groups usable as the input for the dictionary accuracy evaluation job.

Meanwhile, when there is a job definition graph in which the output of the last node is usable as the input, that job definition graph is displayed as the subsequent job candidates 32. In the job execution UI 30 illustrated in FIG. 22, the two job definition graphs that can use the output of the dictionary accuracy evaluation job as the input are displayed as the subsequent job candidates 32. In the job execution UI 30, as a result of connecting the nodes according to the method described above, it becomes possible to sequentially execute a series of jobs.

As described above in detail with reference to specific examples, in the job execution control device 10 according to the first embodiment, a job definition list is displayed in the job definition list UI 20 and, when a job definition is selected from the job definition list UI 20, the already-executed job group usable as the input for the selected job definition is displayed as the input candidates 31 in the job execution UI 30. Subsequently, when any one already-executed job is selected from among the input candidates 31, the job is executed according to the job definition selected from the job definition list UI 20, with the output of the selected already-executed job serving as the input. Thus, in the job execution control device 10 according to the first embodiment, the job selected from a job group having a variety of output and the job that uses the output of the selected job as the input can be connected using simple operations and can be executed.

Moreover, in the job execution control device 10 according to the first embodiment, the job definition group that can use, as the input thereto, the output of the job executed according to the job definition selected from the job definition list UI 20 is displayed as the subsequent job candidates 32 in the job execution UI 30. When any one job definition is selected from among the subsequent job candidates 32, after the job execution is carried out according to the job definition selected from the job definition list UI 20, the subsequent job execution is carried out according to the job definition selected from among the subsequent job candidates 32, with the output of the previous job serving as the input. Thus, in the job execution control device 10 according to the first embodiment, a plurality of consecutive jobs can be executed in an efficient manner.

Furthermore, in the job execution control device 10 according to the first embodiment, the job history graph 41 is displayed using the job history UI 40; and, when any one node in the job history graph 41 is selected, the details of the already-executed job corresponding to the selected node are displayed using the job details UI 50, and the job definition group that can use the output of the already-executed job as the input thereto is displayed as the subsequent job candidates 61 in the subsequent job execution UI 60. Subsequently, when any one job definition is selected from among the subsequent job candidates 61, the job execution is carried out according to the job definition selected from among the subsequent job candidates 61, with the output of the already-executed job selected from the job history graph 41 serving as the input. Thus, in the job execution control device 10 according to the first embodiment, while enabling the user to accurately understand the input-output relationship of the already-executed job group, the subsequent job can be connected to any one already-executed job using simple operations and can be executed.

Moreover, in the job execution control device 10 according to the first embodiment, when a partial range is selected from the job history graph 41 displayed in the job history UI 40, a job definition graph corresponding to that partial range is generated and a job definition list including the job definition graph is displayed in the job definition list UI 20. Subsequently, when a job definition graph is selected from the job definition list UI 20, a series of jobs are executed according to the job definition graph as a result of user operations performed using the job execution UI 30 in an identical manner to the case in which a job definition is selected. Thus, in the job execution control device 10 according to the first embodiment, a plurality of consecutive jobs can be executed in an efficient manner.

Second Embodiment

Given below is the explanation of a second embodiment. In the first embodiment described above, in order to determine an already-executed job that can use the input of a particular job; regarding the arguments having the 'type' category of 'job' in a job definition, it is necessary to specify the 'job_type' in the 'input' category. In contrast, in the second embodiment, in addition to recording the job execution history, an input job definition history is also recorded; and the already-executed jobs that are usable as the input can be determined using the input job definition history. With that, in the job definition, it is no more necessary to explicitly specify the 'job_type'.

In the input job definition history, with respect to the job definition of an already-executed job, the job definitions of other already-executed jobs that were used as the input for the concerned already-executed job and information indicating whether or not the execution of that job was successful are held in a corresponding manner. The input job definition history is recorded by the job executing unit 12 and is stored in the job execution history storing unit 16.

FIG. 23 is a diagram illustrating an example of the input job definition history stored in the job execution history storing unit 16. For example, as illustrated in FIG. 23, the input job definition history can have a data structure in which, with respect to the job definitions of already-executed jobs and with respect to the input argument having the 'type' category of 'job', an array of IDs of a job execution success-failure history is held in a corresponding manner. The job execution success-failure history represents information indicating whether or not job execution was successful regarding each combination of an already-executed job actually used as the input and an already-executed job executed using that input.

In FIG. 24 is illustrated an example of the job execution success-failure history. For example, as illustrated in FIG. 24, the job execution success-failure history includes the following items: "input job ID" representing the ID of the already-executed job used as the input; "job type" of the already-executed job; "execution job ID" representing the ID of the already-executed job that was executed using the abovementioned already-executed job as the input; and "execution result" indicating whether or not the execution was successful. Meanwhile, although the job execution success-failure history illustrated in FIG. 24 is configured to include the job types of input jobs and the execution results of executed jobs, that information need not be included in the job execution success-failure history because the information can be obtained from the job execution history.

As a result of using the input job definition history, it becomes possible to estimate the job type corresponding to the input arguments of the job definition selected from the job definition list UI 20, and to determine the already-executed job group to be displayed as the input candidates 31 in the job execution UI 30. For example, the corresponding job execution success-failure history is searched from the input job definition history, and a certain number of sets of the latest history are obtained from the job execution success-failure history. Then, in the obtained history, the job type that has the record of successful execution in the past is determined to be the job type corresponding to the input arguments of the job definition selected from the job definition list UI 20. Then, the already-executed job group executed according to the job definition corresponding to the abovementioned job type is displayed as the input candidates 31 in the job execution UI 30.

Meanwhile, as a method other than the method of estimation from the latest history, an execution success rate can be calculated in particular job types in the entire job execution success-failure history, and the job type for which the execution success rate is equal to or greater than a certain value can be determined to be the job type corresponding to the input arguments of the job definition selected from the job definition list UI 20. Meanwhile, if the corresponding job execution success-failure history is not available, then the latest already-executed jobs in the job execution history can be displayed as the input candidates 31 without performing filtering according to the job type.

According to the second embodiment, regarding the argument having the 'type' category of 'job' of the job definition, even if the 'job_type' in the 'input' category is not explicitly specified in the job definition, an already-executed job that is usable as the input for a particular job can be appropriately determined. Hence, while reducing the time and efforts at the time of generating the job definitions in advance, the effects identical to the effects achieved in the first embodiment can be achieved.

Third Embodiment

Given below is the explanation of a third embodiment. In the third embodiment, as auxiliary information for enabling selection of an already-executed job from the input candidates 31 in the job execution UI 30, the concept of scores indicating the quality of the processing result (output) of the already-executed jobs is introduced. Then, the already-executed job group representing the input candidates 31 is displayed in a display format in accordance with the scores of the already-executed jobs in the job execution UI 30.

FIG. 25 is a diagram illustrating an exemplary job definition for which the score can be calculated, and illustrating the job definition of the dictionary accuracy evaluation job. In the job definition illustrated in FIG. 25, a 'score' category is used to specify such a property name of the output JSON which is to be treated as the score of that job. Moreover, the degree of derivation of the score from the input of each argument can be written as 'score_impact' in that argument of the input. When the score is calculated from a job that is executed with a particular already-executed job serving as the input thereto, the result of multiplications of the values in the 'score_impact' with respect to that score represents the score of the already-executed job that was used as the input.

In the case in which, with respect to a particular already-executed job, the score can be calculated not only from the 'score' category in the job definition of that job but also from the 'score_impact' in the job definition of another job that uses the concerned already-executed job as the input thereto; the score calculated from the 'score' category is given precedence.

The score calculated for an already-executed job can be added to the job execution history and be recorded, for example. FIG. 26 is a diagram illustrating an example of the job execution history including the scores, and illustrating an example in which the scores are added to the job execution history illustrated in FIG. 6. Meanwhile, in FIG. 26; the input, the output, the completion time, and the state are not illustrated.

Figure 27:
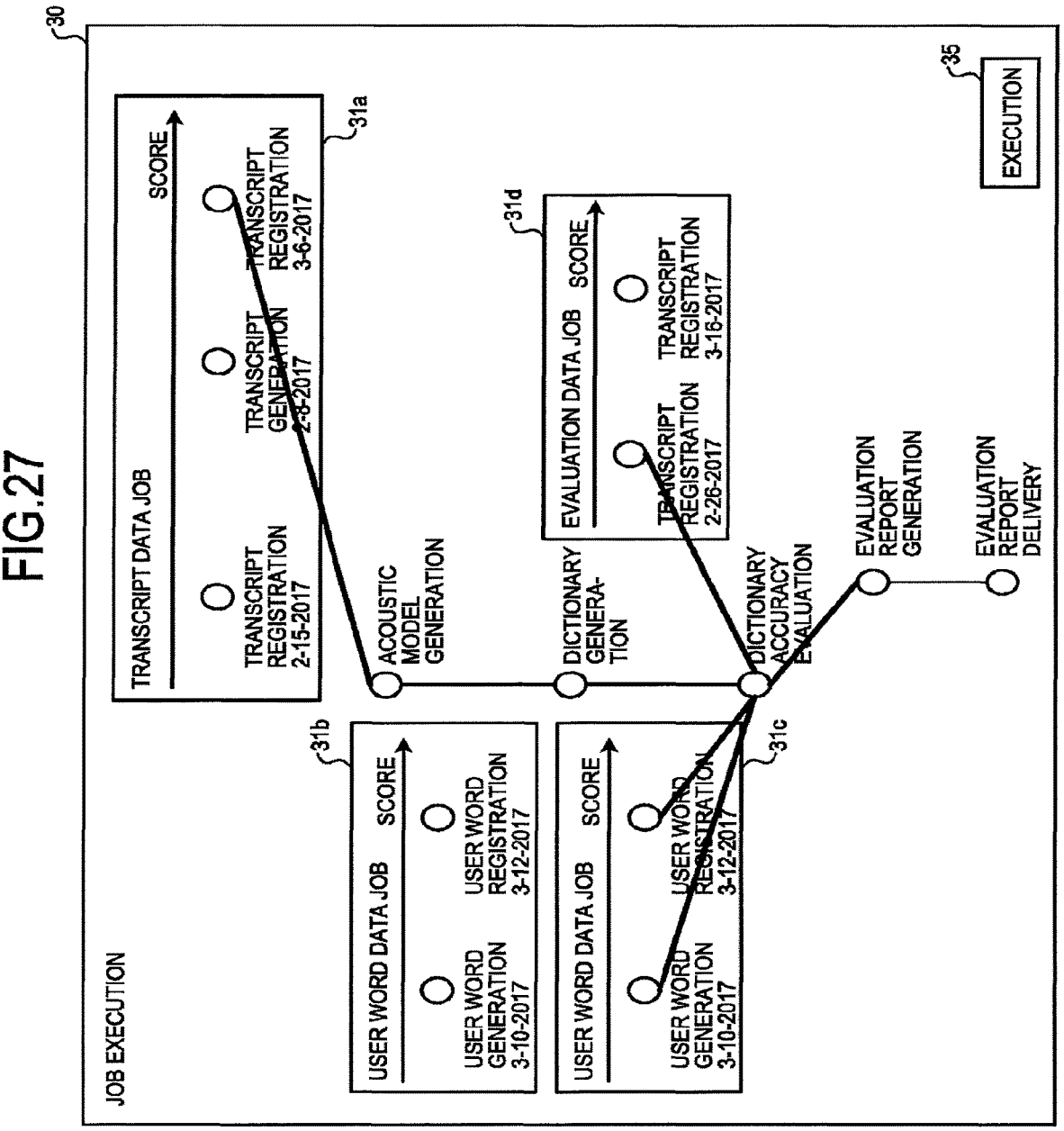
FIG. 27 is a diagram illustrating an example of the job execution UI.

When the scores are calculated for the already-executed jobs, the already-executed job group displayed as the input candidates 31 in the job execution UI 30 can be displayed in a display format in accordance with the scores of the already-executed jobs. In FIG. 27 is illustrated an example of the job execution UI 30 in that case. The job execution UI 30 illustrated in FIG. 27 has an identical configuration to the configuration of the job execution UI 30 illustrated in FIG. 22. However, the already-executed job group in the input candidates 31a of the acoustic model generation job, the already-executed job group in the input candidates 31b of the dictionary generation job, and the already-executed job groups in the input candidates 31c and 31d of the dictionary accuracy evaluation job are arranged in such a way that the already-executed job having the highest score is positioned on the rightmost side and the already-executed job having the lowest score is positioned on the leftmost side. Meanwhile, the display format in accordance with the scores is not limited to using the display positions as illustrated in FIG. 27, and alternatively the scores can be illustrated using some other display format such as color, concentration, or brightness.

Figure 28:
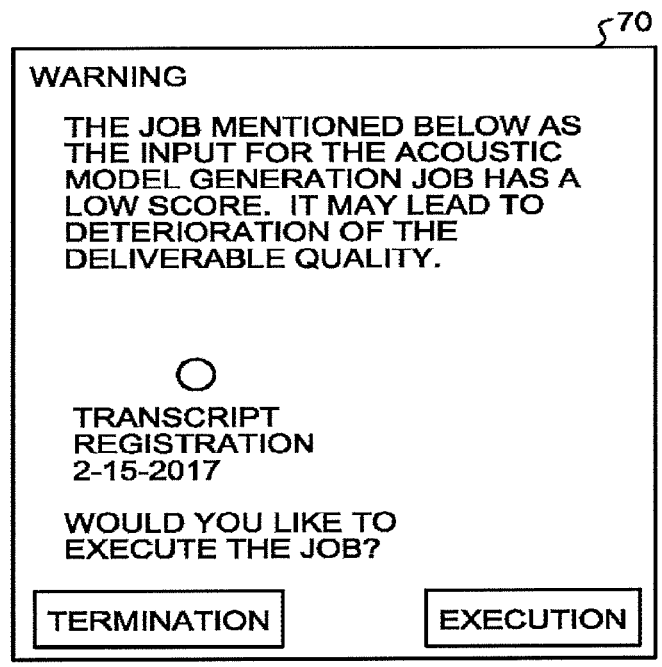
FIG. 28 is a diagram illustrating an example of a warning UI.

Meanwhile, if the user selects, as the input, an already-executed job having a lower score than the other already-executed jobs from among the input candidates 31, a warning UI 70 as illustrated in FIG. 28 can be displayed. As described above, as a result of displaying the job execution UI 30 that enables recognition of the scores of the already-executed job group or as a result of displaying the warning UI 70 in the case in which an already-executed job having a low score is selected, it becomes possible to reduce the risk in which an inexperienced user selects an already-executed job of low quality as the input for a job to be newly executed.

Meanwhile, as the input for a job for which the score can be calculated, a plurality of already-executed jobs can be made simultaneously selectable from among the input candidates 31. In FIG. 27 is illustrated an example in which two of the already-executed jobs included in the input candidates 31c of the dictionary accuracy evaluation job are selected as the input for the dictionary accuracy evaluation job. When a plurality of already-executed jobs is simultaneously selected as the input for a job for which the score can be calculated, the job is executed for a plurality of number of times, with the output of each selected already-executed job serving as the input in one instance. Then, for example, the processing result having the highest score is treated as the output of the job. Alternatively, the job having different inputs can be treated as a plurality of separate jobs.

According to the third embodiment, at the time of displaying the job execution UI 30, the already-executed job group representing the input candidates 31 is displayed in the display format in accordance with the scores of the already-executed jobs. Hence, the already-executed job to be used as the input can be selected in a more appropriate manner.

Fourth Embodiment

Given below is the explanation of a fourth embodiment. In the first embodiment described above, the range to be clipped as a job definition graph from the job history graph 41, which is displayed in the job history UI 40, is specified by the user. In the fourth embodiment, the job definition graph generating unit 14 automatically generates a job definition graph based on the job execution history. That is, the job definition graph generating unit 14 according to the fourth embodiment refers to the job execution history storing unit 16; extracts the pattern of job definition groups, which correspond to a plurality of sequentially-executed jobs, according to a predetermined standard; and generates a job definition graph indicating a plurality of job definitions included in the extracted pattern and indicating the input-output relationship of each job definition.

Figure 29:
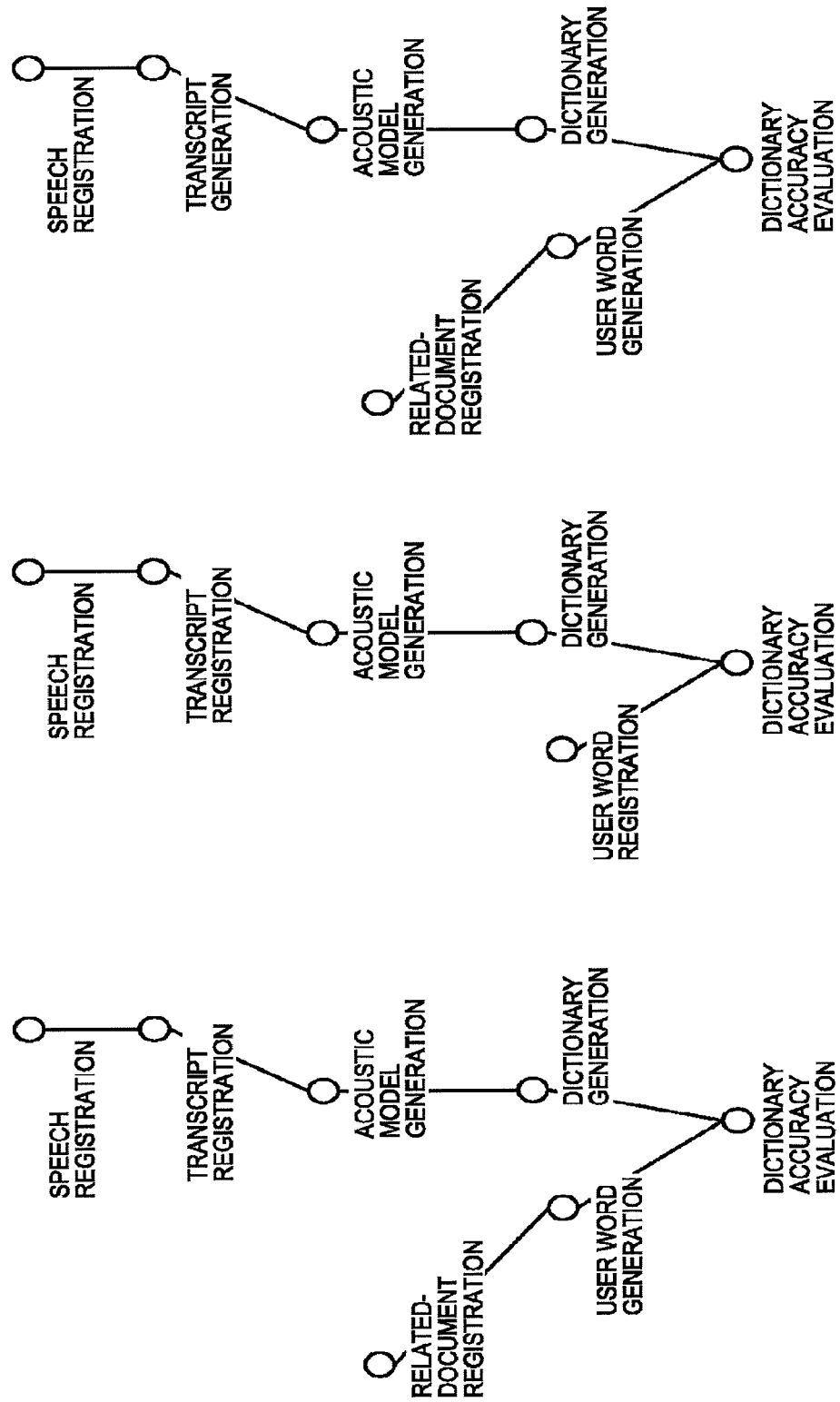
FIG. 29 is a diagram that graphically illustrates the input-output relationship of the already-executed job groups as understandable from the job execution history.

FIG. 29 is a diagram that graphically illustrates the input-output relationship of the already-executed job groups as understandable from the job execution history. In FIG. 29 are illustrated three graphs indicating the input-output relationship of the already-executed job groups linked to the dictionary accuracy evaluation job. In the fourth embodiment, at the time of generating a job definition graph, firstly, from the graphs indicating the input-output relationship of the already-executed job groups illustrated in FIG. 29, sequences of job definitions of the already-executed jobs that are sequentially executed are extracted as job flow sequences. In FIG. 30 are illustrated the job flow sequences extracted from the graphs illustrated in FIG. 29. With reference to FIG. 30, the job flow sequences having the ID=1 and ID=2 represent job flow sequences extracted from the left-side graph illustrated in FIG. 29; the job flow sequences having the ID=3 and ID=4 represent job flow sequences extracted from the middle graph illustrated in FIG. 29; and the job flow sequences having the ID=5 and ID=6 represent job flow sequences extracted from the right-side graph illustrated in FIG. 29.

In the fourth embodiment, from the job flow sequences extracted in the manner described above, for example, a frequent-portion sequence pattern extraction method is implemented and the pattern of frequent job definition groups in the sequences is extracted. From the job flow sequences illustrated in FIG. 30, the most frequent pattern is "acoustic model generation→dictionary generation→dictionary accuracy evaluation" that appears in three out of six job flow sequences, thereby having the probability of appearance of 50%. For example, if the probability of appearance of 50% or greater is specified as the threshold value of the target patterns for extraction, then the above-mentioned pattern happens to be a target pattern for extraction and gets automatically registered as a job definition graph.

Meanwhile, for the purpose of extracting the pattern of job definition groups to be registered as job definition graphs, some other condition other than the probability of appearance can also be used. For example, in the case in which scores are calculated for the already-executed jobs as explained in the third embodiment, the pattern can be extracted for such job definition groups which have the average score of the already-executed jobs, which are sequentially executed, to be equal to or greater than a reference value. Alternatively, the pattern can be extracted for such job definition groups which have the number of already-executed jobs that are sequentially executed (i.e., when expressed as a graph, the number of nodes) to be equal to or greater than a reference value. Still alternatively, when the configuration is such that the job execution history including the information about the user who instructed the execution of a series of already-executed job groups is recorded, it is possible to extract the pattern of such job definition groups which represent the already-executed job groups that are sequentially executed in response to an instruction from a particular user who is skilled in performing the operations.

Meanwhile, in the abovementioned method of extracting the pattern of job definition groups, which are to be registered as job definition graphs, from the job flow sequences; it is only possible to generate job definition graphs in which the job definitions are placed in series. However, alternatively, using a known graph mining method, frequently-appearing subgraphs can be found from the graphs illustrated in FIG. 29 and can be set as job definition graphs. In that case, it also becomes possible to generate a job definition graph in which a plurality of job definitions is linked as the input for a single job definition.

According to the fourth embodiment, since the job definition graphs are automatically generated based on the job execution history, the operation load of the user can be reduced.

Supplementary Explanation

The job execution control device 10 according to the embodiments described above can be implemented according to, for example, cooperation between hardware configuring a general-purpose computer and computer programs (software) executed in the computer. For example, when the computer executes a predetermined computer program, the functional constituent elements such as the display control unit 11, the job executing unit 12, the job execution history searching unit 13, and the job definition graph generating unit 14 can be implemented. Moreover, using the storage devices of the computer, the job definition storing unit 15, the job execution history storing unit 16, and the job result storing unit 17 can be implemented.

Figure 31:
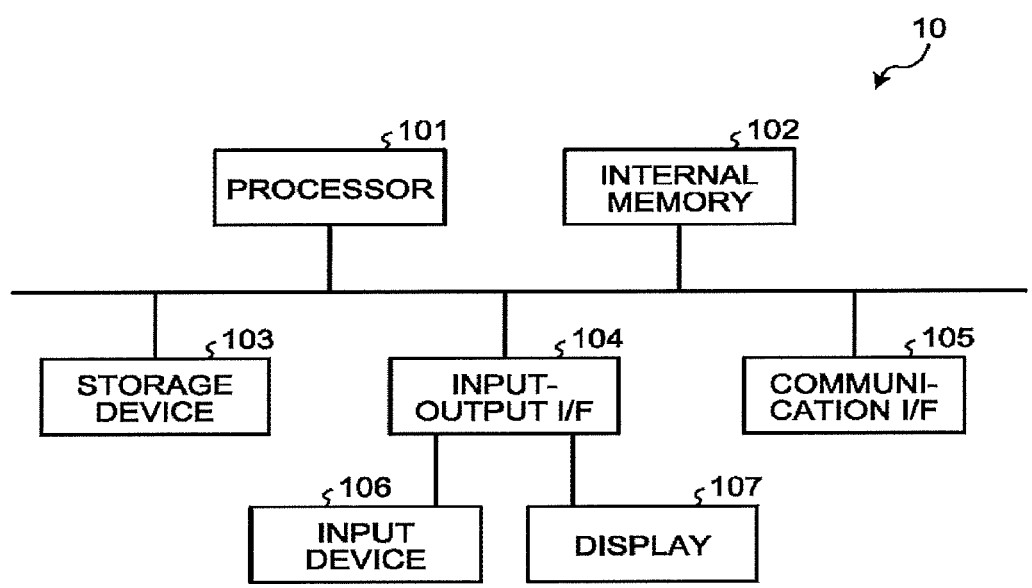
FIG. 31 is a block diagram illustrating an exemplary hardware configuration of the job execution control device.

FIG. 31 is a block diagram illustrating an exemplary hardware configuration of the job execution control device 10 according to the embodiments. For example, as illustrated in FIG. 31, the job execution control device 10 according to the embodiments has the hardware configuration of a general-purpose computer that includes a processor 101 such as a central processing unit (CPU) or a graphics processing unit (GPU); an internal memory 102 such as a random access memory (RAM) or a read only memory (ROM); a storage device 103 such as a hard disc drive (HDD) or a solid state drive (SDD); an input-output interface (I/F) 104 for connecting peripheral devices such as an input device 106 and a display 107; and a communication I/F 105 for performing communication with external devices such as client terminals. For example, the processor 101 uses the internal memory 102 and executes a computer program stored in the storage device 103 or the internal memory 102, so that the abovementioned functional constituent elements are implemented.

That is, each component representing the functional constituent element of the job execution control device 10 according to the embodiments is included in the computer program executed by the computer; and, when one or more processors (the processor 101 illustrated in FIG. 31) of the computer executes the computer program, each component gets generated in a main memory such as a RAM (the internal memory 102 illustrated in FIG. 31).

The computer program executed by the computer is recorded in, for example, a magnetic disc (a flexible disc or a hard disc), an optical disc (a CD-ROM, a CD-R, a CD-RW, a DVD-ROM, a DVD±R, DVD±RW, or a Blu-ray (registered trademark) disc), or a semiconductor memory, or a recording medium of similar type. As long as the recording medium in which the computer program is to be recorded is a computer-readable recording medium, any storage format can be used. Meanwhile, the computer program can be configured to have the computer program installed therein in advance, or can be configured in such a way that the computer program that is distributed via a network is installed when necessary.

Alternatively, in the job execution control device 10 according to the embodiments, the functional constituent elements can be entirely or partially implemented using dedicated hardware such as an application specific integrated circuit (ASIC) or a field-programmable gate array (FPGA).

Meanwhile, the job execution control device 10 according to the embodiments can be configured as a network system in which a plurality of computers is communicably connected to each other, and the functional constituent elements can be implemented among a plurality of computers in a dispersed manner. Alternatively, the job execution control device 10 according to the embodiments can be a virtual machine running in a cloud system. Meanwhile, the job execution control device 10 according to the embodiments is not limited to be a server of a server-client system built using a network. Alternatively, the job execution control device 10 according to the embodiments can be implemented using an information processing device such as a personal computer used by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A job execution control device that controls execution of a job defined according to a job definition including a job type, the job execution control device comprising:

processing circuitry configured to function as:

a display control unit that controls display of a UI screen meant for receiving a user operation; and a job executing unit that executes a job according to a user operation performed using the UI screen and records a job execution history, wherein output data of the job that is generated by executing the job is stored in job result storage, wherein the display control unit displays a job definition list in the UI screen and, when any one job definition is selected from the job definition list, displays the UI screen including, as input candidates, one or more already-executed jobs usable as input for a job to be executed according to the selected job definition, and, as first subsequent job candidates, one or more job definitions capable of using, as input thereto, output data of the job executed according to the selected job definition, and when an already-executed job is selected from among the input candidates and a job definition is selected from among the first subsequent candidates, the job executing unit executes a new job according to the job definition selected from the job definition list, using, as an input of the new job to be executed, output data of the selected already-executed job stored in the job result storage, and then, using output data of the new job as input, executes a subsequent job according to the job definition selected from among the first subsequent job candidates.

2. The job execution control device according to claim 1, wherein
the job executing unit further records, with respect to job definition of an already-executed job, an input job definition history in which job definition of another already-executed job that was used as input for the already-executed job and information indicating whether or not job execution was successful are held in a corresponding manner, and
the display control unit identifies, based on the input job definition history, job definition that has been used as input when the job executed according to the job definition selected from the job definition list was successful, and displays, as the input candidate in the UI screen, an already-executed job executed according to the identified job definition.

3. The job execution control device according to claim 1, wherein
the job executing unit records the job execution history that includes scores indicating quality of output data of already-executed jobs, and
the display control unit displays already-executed jobs, which represent the input candidates, in a display format in accordance with the scores in the UI screen.

4. The job execution control device according to claim 3, wherein the display control unit displays a warning when an already-executed job having the score lower than a reference value is selected from among the input candidates.

5. The job execution control device according to claim 1, wherein, when a plurality of already-executed jobs is selected from among the input candidates, the job executing unit performs job execution repeatedly for a plurality of number of times, using, as the input of the job to be executed, output data of each selected already-executed job.

6. The job execution control device according to claim 5, wherein, from among output data of the job executed repeatedly for a plurality of number of times, the job executing unit treats, as output data of the job, output data having a highest score, the score indicating quality of the output data.

7. The job execution control device according to claim 1, wherein
the display control unit
displays, in the UI screen, a job history graph in which a plurality of already-executed jobs including jobs being executed and jobs waiting to be executed serve as nodes, and in which nodes are connected by edges representing an input-output relationship between the plurality of already-executed jobs, and
when any one already-executed job displayed as a node of the job history graph is selected, displays, as second subsequent job candidates in the UI screen, one or more job definitions capable of using output data of the selected already-executed job as input thereto, and when a job definition is selected from among the second subsequent job candidates, the job executing unit performs job execution according to the job definition selected from among the second subsequent job candidates, using, as the input of the job to be executed, output data of the already-executed job, which is selected from the job history graph.

8. The job execution control device according to claim 7, wherein the processing circuitry is further configured to function as a job definition graph generating unit that, when a partial range of the job history graph is specified, generates a job definition graph indicating a plurality of job definitions corresponding to each node included in the specified range and indicating input-output relationship of the job definitions, wherein
when the job definition graph is generated, at time of displaying the job definition list in the UI screen, the display control unit displays the job definition list including the job definition graph, and
when the job definition graph is selected from the job definition list, the job executing unit sequentially executes a plurality of jobs according to the job definition graph and according to a plurality of job definitions included in the job definition graph.

9. The job execution control device according to claim 1, wherein the processing circuitry is further configured to function as a job definition graph generating unit that, based on the job execution history, extracts, according to a predetermined standard, a pattern of job definition groups corresponding to a plurality of sequentially-executed jobs and generates a job definition graph indicating a plurality of job definitions included in the extracted pattern and indicating input-output relationship of the job definitions, wherein
when the job definition graph is generated, at time of displaying the job definition list in the UI screen, the display control unit displays the job definition list including the job definition graph, and
when the job definition graph is selected from the job definition list, the job executing unit sequentially executes a plurality of jobs according to the selected job definition graph and a plurality of job definitions included in the selected job definition graph.

10. The job execution control device according to claim 9, wherein the job definition graph generating unit extracts a pattern of the job definition groups appearing frequently, and generates the job definition graph.

11. The job execution control device according to claim 9, wherein
the job executing unit records the job execution history that includes scores indicating a quality of output data of already-executed jobs, and
the job definition graph generating unit extracts the pattern of the job definition groups having average of scores of a plurality of sequentially-executed jobs to be equal to or greater than a reference value, and generates the job definition graph.

12. The job execution control device according to claim 9, wherein the job definition graph generating unit extracts the pattern of the job definition groups having a number of a plurality of sequentially-executed jobs to be equal to or greater than a reference value, and generates the job definition graph.

13. The job execution control device according to claim 9, wherein
the job executing unit records the job execution history that includes information about user who instructs an execution of already-executed jobs, and the job definition graph generating unit extracts the pattern of the job definition groups corresponding to a plurality of jobs sequentially executed in response to an instruction from a particular user, and generates the job definition graph.

14. The job execution control device according to claim 1, wherein
the job definition includes a job type, and
the display control unit selects the one or more already-executed jobs, based on job types of job definitions of the one or more already-executed jobs.

15. The job execution control device according to claim 1, wherein the job definition of the new job is different from the job definition of the selected already-executed job.

16. A job execution control method that is implemented in a job execution control device according to a job definition, the job execution control method comprising:
controlling display of a UI screen meant for receiving a user operation; and
executing a job according to a user operation performed using the UI screen and recording a job execution history, wherein output data of the job that is generated by executing the job is stored in job result storage, wherein
the controlling includes displaying a job definition list in the UI screen and, when any one job definition is selected from the job definition list, the controlling includes displaying the UI screen including, as input candidates, one or more already-executed jobs usable as input for a job to be executed according to the selected job definition, and, as first subsequent job candidates, one or more job definitions capable of using, as input thereto, output data of the job executed according to the selected job definition, and
when an already-executed job is selected from among the input candidates and a job definition is selected from among the first subsequent job candidates, the executing executes a new job according to the job definition selected from the job definition list, using, as an input of the new job to be executed, output data of the selected already-executed job stored in the job result storage, and then, using output data of the first new job as input, executes a subsequent job according to the job definition selected from among the first subsequent job candidates.

17. A computer program product having a non-transitory computer readable medium including programmed instructions, wherein the instructions, when executed by a computer, cause the computer to implement a job execution control method, the job execution control method comprising:
controlling display of a UI screen meant for receiving a user operation; and
executing a job according to a user operation performed using the UI screen and recording a job execution history, wherein output data of the job that is generated by executing the job is stored in job result storage, wherein
the controlling includes displaying a job definition list in the UI screen and, when any one job definition is selected from the job definition list, the controlling includes displaying the UI screen including as input candidates, one or more already-executed jobs usable as input for a job to be executed according to the selected job definition, and, as first subsequent job candidates, one or more job definitions capable of using, as input thereto, output data of a job executed according to the selected job definition, and
when an already-executed job is selected from among the input candidates and a job definition is selected from among the first subsequent job candidates, the executing executes a new job according to the job definition selected from the job definition list, using, as an input of the new job to be executed, output data of the selected already-executed job stored in the job result storage, and then, using output data of the new job as input, executes a subsequent job according to the job definition selected from among the first subsequent job candidates.

* * * * *